United States Patent
Lovell et al.

(10) Patent No.: US 10,325,197 B2
(45) Date of Patent: *Jun. 18, 2019

(54) METHODS AND APPARATUS FOR RFID COMMUNICATIONS IN A PROCESS CONTROL SYSTEM

(71) Applicant: Fisher Controls International LLC, Marshalltown, IA (US)

(72) Inventors: Michel Ken Lovell, Marshalltown, IA (US); Kenneth W. Junk, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,371

(22) Filed: Jan. 22, 2018

(65) Prior Publication Data
US 2018/0144231 A1 May 24, 2018

Related U.S. Application Data

(63) Continuation of application No. 14/297,179, filed on Jun. 5, 2014, now Pat. No. 9,881,250.
(Continued)

(51) Int. Cl.
*H04Q 5/22* (2006.01)
*G06K 19/077* (2006.01)
*G05B 15/02* (2006.01)

(52) U.S. Cl.
CPC ....... *G06K 19/07758* (2013.01); *G05B 15/02* (2013.01); *Y10T 29/49018* (2015.01)

(58) Field of Classification Search
CPC .............. G06K 19/07758; G05B 15/02; Y10T 29/49018
(Continued)

(56) References Cited

U.S. PATENT DOCUMENTS 5,420,578 A 5/1995 O'Brien et al.
7,058,542 B2 6/2006 Hauhia et al.
(Continued)

FOREIGN PATENT DOCUMENTS

DE 102009006662 7/2010
DE 102011081517 2/2013
(Continued)

OTHER PUBLICATIONS

AMS AG, "RFID with Senses—SL13A—ISO 15693 Sensor Tag IC," [www.ams.com/SL13A], dated Feb. 2013, 2 pages.
(Continued)

*Primary Examiner* — Kerri L McNally
*Assistant Examiner* — Thang D Tran
(74) *Attorney, Agent, or Firm* — Hanley, Flight & Zimmerman, LLC

(57) ABSTRACT

Methods and apparatus for RFID communications in a process control system are disclosed. An example apparatus includes a radio-frequency identification (RFID) device to be communicatively coupled to a field device of a process control system via a wired connection. The RFID device includes an RFID tag to be powered via the wired connection based on power provided to the field device. The power is provided to the field device along with a control signal.

20 Claims, 11 Drawing Sheets

Related U.S. Application Data

(60) Provisional application No. 61/832,524, filed on Jun. 7, 2013, provisional application No. 61/951,187, filed on Mar. 11, 2014, provisional application No. 61/977,398, filed on Apr. 9, 2014.

(58) Field of Classification Search
USPC .............. 340/10.34, 572.1–572.9, 10.1–10.6
See application file for complete search history.

(56) References Cited

U.S. PATENT DOCUMENTS

| | | | |
|---|---|---|---|
| 7,640,007 B2* | 12/2009 | Chen .................. | G05B 19/0423 340/10.1 |
| 7,828,008 B1 | 11/2010 | Beckman et al. | |
| 7,880,670 B2* | 2/2011 | Villarroel .......... | G01R 29/0871 342/165 |
| 8,212,655 B2* | 7/2012 | Nelson ................ | G01D 21/00 137/487.5 |
| 8,384,519 B2 | 2/2013 | Kuhl et al. | |
| 8,860,611 B1 | 10/2014 | Anderson et al. | |
| 9,893,770 B2 | 2/2018 | Junk et al. | |
| 2002/0067267 A1 | 6/2002 | Kirkham | |
| 2004/0195319 A1* | 10/2004 | Forster ................ | G06K 7/0008 235/385 |
| 2005/0249252 A1* | 11/2005 | Sanchez ............. | H01S 5/06832 372/38.07 |
| 2005/0280511 A1* | 12/2005 | Yokoyama ........... | G06K 19/07 340/10.5 |
| 2006/0200256 A1* | 9/2006 | Mason ................ | G05B 19/054 700/65 |
| 2006/0244568 A1 | 11/2006 | Tong et al. | |
| 2007/0021140 A1 | 1/2007 | Keyes, IV et al. | |
| 2007/0114280 A1 | 5/2007 | Coop et al. | |
| 2007/0247284 A1* | 10/2007 | Martin ............... | G06K 7/10316 340/10.1 |
| 2008/0048837 A1 | 2/2008 | Montgomery et al. | |
| 2008/0138701 A1* | 6/2008 | Kuboki .................. | H01M 2/08 429/129 |
| 2008/0174436 A1* | 7/2008 | Landt ................. | G06K 19/0704 340/572.7 |
| 2008/0238679 A1 | 10/2008 | Rofougaran et al. | |
| 2008/0277463 A1 | 11/2008 | Braun | |
| 2009/0015216 A1* | 1/2009 | Seberger .............. | H02M 3/155 323/234 |
| 2009/0292572 A1* | 11/2009 | Alden ................ | G05B 19/0428 366/2 |
| 2009/0303898 A1 | 12/2009 | Isenmann et al. | |
| 2010/0231407 A1* | 9/2010 | Carr .................. | G06K 19/0723 340/691.1 |
| 2010/0302008 A1 | 12/2010 | Engelstad et al. | |
| 2011/0111695 A1* | 5/2011 | Shameli .................. | H04B 5/02 455/41.1 |
| 2011/0131455 A1 | 6/2011 | Law et al. | |
| 2011/0279239 A1 | 11/2011 | Gravelle et al. | |
| 2012/0040698 A1* | 2/2012 | Ferguson ............. | G05B 19/042 455/457 |
| 2012/0068827 A1 | 3/2012 | Yi et al. | |
| 2012/0135681 A1 | 5/2012 | Adams et al. | |
| 2012/0252361 A1* | 10/2012 | Stromberger .......... | G06Q 10/08 455/41.1 |
| 2013/0035802 A1 | 2/2013 | Khaitan et al. | |
| 2013/0134226 A1 | 5/2013 | Chen | |
| 2013/0141888 A1 | 6/2013 | Wittmer et al. | |
| 2013/0176115 A1* | 7/2013 | Puleston ................ | H04L 67/04 340/10.51 |
| 2013/0190897 A1 | 7/2013 | Junk et al. | |
| 2013/0201003 A1 | 8/2013 | Sabesan et al. | |
| 2013/0249301 A1 | 9/2013 | Smoot et al. | |
| 2013/0288595 A1 | 10/2013 | Lee et al. | |
| 2014/0062661 A1 | 3/2014 | Gallo et al. | |
| 2014/0104044 A1 | 4/2014 | Morimoto | |
| 2014/0107993 A1* | 4/2014 | Cheng .................. | G05B 17/02 703/13 |
| 2014/0183261 A1* | 7/2014 | Ung ..................... | G06K 7/0008 235/439 |
| 2014/0203915 A1 | 7/2014 | Puleston et al. | |
| 2014/0313050 A1 | 10/2014 | Hamilton et al. | |
| 2014/0361087 A1 | 12/2014 | Lovell | |
| 2014/0364963 A1 | 12/2014 | Lovell et al. | |
| 2015/0088617 A1 | 3/2015 | Geist et al. | |
| 2015/0123815 A1* | 5/2015 | Mejegard ............... | G06Q 10/06 340/870.07 |
| 2015/0171930 A1 | 6/2015 | Joehren | |
| 2015/0254677 A1 | 9/2015 | Huxham et al. | |
| 2016/0299478 A1 | 10/2016 | Junk et al. | |
| 2017/0005703 A1 | 1/2017 | Junk et al. | |

FOREIGN PATENT DOCUMENTS

| | | |
|---|---|---|
| DE | 102012214693 | 2/2013 |
| DE | 102011084789 | 4/2013 |
| EP | 1832943 | 9/2007 |
| WO | 2010094301 | 8/2010 |
| WO | 2013112421 | 8/2013 |
| WO | 2014197779 | 12/2014 |
| WO | 2014197785 | 12/2014 |

OTHER PUBLICATIONS

AMS AG, "RFID with Senses—SL900A EPC Gen2 Sensor Tag IC," [www.ams.com/SL900A], dated Feb. 2013, 2 pages.

Swedberg, "BP Uses RFID Sensors to Track Pipe Corrosion," RFID Journal, [http://www.rfidjournal.com/articles/view?8181], dated Jan. 31, 2011, retrieved May 12, 2014, 2 pages.

Dobkin "The RF in RFID: UHF RFID in Practice," Newnes, Nov. 1, 2012, Burlington, MA, p. 38, 1 page.

Dobkin "The RF in RFID: UHF RFID in Practice," Newnes, Nov. 1, 2012, Burlington, MA, p. 40.

De Donno et al, "Enabling Self-Powered Autonomous Wireless Sensors with New-Generations I2C-RFID Chips," 201 IEEE MTT-S International Microwave Symposium Digest (MTT), Seattle, WA, Jun. 2013, 4 pages.

Emerson Process Management, "Fisher FIELDVUE DVC6200 Series Digital Valve Controllers," Quick Start Guide, Jan. 2014, 68 pages.

IDS Microchip AG, "SL900A Single-Chip EPC Data Logger with Sensor," [www.ids-microchip.com], dated Mar. 2010, 2 pages.

Impinj, "Introducing Monza X Chips," [www.impinj.com], dated 2012, 2 pages.

Intelleflex Corporation, "Intelleflex TMT-8500 Temperature Monitoring Tag," Intelleflex data sheet, [www.intelleflex.com], dated 2010, 2 pages.

Intelleflex Corporation, "Intelleflex SMT-8100 Special Purpose RFID Tag for Metals & Liquids," [www.intelleflex.com]dated 2012, 2 pages.

Intelleflex Corporation, "Comparison of Intelleflex Semi-Passive BAP, Active, and Passive RFID," 2015, [http://intelleflex.com/Products.Semi-Passive-vs-Active-RFID.asp], retrieved on Sep. 16, 2015, 1 page.

International Searching Authority, "International Search Report," issued in connection with International Patent Application No. PCT/US2014/041265, dated Sep. 17, 2014, 3 pages.

International Searching Authority, "Written Opinion," issued in connection with International Patent Application No. PCT/US2014/041265, dated Sep. 17, 2014, 8 pages.

International Bureau, "International Preliminary Report on Patentability," issued in connection with PCT Application No. PCT/US2014/041265, dated Dec. 17, 2015, 10 pages.

International Searching Authority, "International Search Report," issued in connection with International Patent Application No. PCT/US2014/041279, dated Sep. 18, 2014, 5 pages.

International Searching Authority, "Written Opinion," issued in connection with International Patent Application No. PCT/US2014/041279, dated Sep. 18, 2014, 6 pages.

International Bureau, "International Preliminary Report on Patentability," issued in connection with International Patent Application No. PCT/US2014/041279, dated Dec. 8, 2015, 7 pages.

(56) References Cited

OTHER PUBLICATIONS

STMicroelectronics, "Dynamic NFC/RFID tag IC with 16-Kbit EEPROM, energy harvesting, I²C bus and ISO 15693 RF interface," Datasheet≥Production Data, dated Jun. 2013, 143 pages.
Tego, "TegoChip Dual Memory (DM)," [www.tegoinc.com], dated 2013, 2 pages.
United States Patent and Trademark Office, "Non-Final Office Action," issued in connection with U.S. Appl. No. 14/684,016, dated Jun. 16, 2017, 19 pages.
United States Patent and Trademark Office, "Non-Final Office Action," issued in connection with U.S. Appl. No. 15/183,439, dated Jan. 17, 2017, 34 pages.
United States Patent and Trademark Office, "Final Office Action," issued in connection with U.S. Appl. No. 15/183,439, dated Jul. 26, 2017, 22 pages.
United States Patent and Trademark Office, "Non-Final Office Action," issued in connection with U.S. Appl. No. 14/297,179, dated Jun. 30, 2016, 22 pages.
United States Patent and Trademark Office, "Final Office Action," issued in connection with U.S. Appl. No. 14/297,179, dated Nov. 22, 2016, 31 pages.
United States Patent and Trademark Office, "Notice of Allowance," issued in connection with U.S. Appl. No. 14/297,179, dated Sep. 13, 2017, 14 pages.
William Frick & Company, "Solar Powered RFID tag (Off-Metal)," technical data sheet, [www.fricknet.com], 4 pages.
United States Patent and Trademark Office, "Notice of Allowance," issued in connection with U.S. Appl. No. 15/183,439, dated Dec. 18, 2017, 7 pages.
United States Patent and Trademark Office, "Final Office Action," issued in connection with U.S. Appl. No. 14/684,016, dated Dec. 26, 2017, 14 pages.
United States Patent and Trademark Office, "Non-Final Office Action," issued in connection with U.S. Appl. No. 14/684,016, dated May 22, 2018, 16 pp.

\* cited by examiner

METHODS AND APPARATUS FOR RFID COMMUNICATIONS IN A PROCESS CONTROL SYSTEM

RELATED APPLICATION

This patent is a continuation of U.S. application Ser. No. 14/297,179 filed on Jun. 5, 2014, which claims priority to U.S. Provisional Application Ser. No. 61/832,524 filed on Jun. 7, 2013; U.S. Provisional Application Ser. No. 61/951,187 filed on Mar. 11, 2014; and U.S. Provisional Application Ser. No. 61/977,398 filed on Apr. 9, 2014. U.S. application Ser. No. 14/297,179; U.S. Provisional Application Ser. No. 61/832,524; U.S. Provisional Application Ser. No. 61/951,187; and U.S. Provisional Application Ser. No. 61/977,398 are hereby incorporated by reference in their entireties.

FIELD OF THE DISCLOSURE

This disclosure relates generally to process control systems and, more particularly, to methods and apparatus for RFID communications in a process control system.

BACKGROUND

Process control systems, like those used in chemical, petroleum or other processes, typically include one or more process controllers communicatively coupled to one or more field devices via analog, digital or combined analog/digital buses. The field devices, which may be, for example, instruments, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, to make other process control decisions, and to initiate process control system alarms.

Information from the field devices and/or the controller is usually made available over a data highway or communication network to one or more other devices or systems, such as operator work stations, personal computers, data historians, report generators, centralized databases, etc. Such devices or systems are typically located in control rooms and/or other locations remotely situated relative to the harsher plant environment. These devices or systems, for example, run applications that enable an operator to perform any of a variety of functions with respect to the process implemented by a process control system, such as viewing the current state of a process, changing an operating state, changing settings of a process control routine, modifying the operation of the process controllers and/or the field devices, viewing alarms generated by field devices and/or process controllers, simulating the operation of the process for the purpose of training personnel and/or evaluating the process, etc.

SUMMARY

Methods and apparatus for RFID communications in a process control system are disclosed. An example apparatus includes a radio-frequency identification (RFID) device to be communicatively coupled to a field device of a process control system via a wired connection. The RFID device includes an RFID tag to be powered via the wired connection based on power provided to the field device. The power is provided to the field device along with a control signal.

Another example apparatus includes a field device of a process control system. The field device is to receive power and a control signal from a distributed control system. The apparatus also includes a radio-frequency identification (RFID) device operatively coupled to the field device via a wired connection. The RFID device has an RFID tag to receive at least a portion of the power provided to the field device via the wired connection.

An example method includes receiving, at a radio-frequency identification (RFID) device, power provided to a field device of a process control system via a wired connection. The power provided to the field device is associated with a control signal provided to the field device. The method also includes powering an RFID tag of the RFID device with the power provided to the field device.

DETAILED DESCRIPTION

Figure 1:
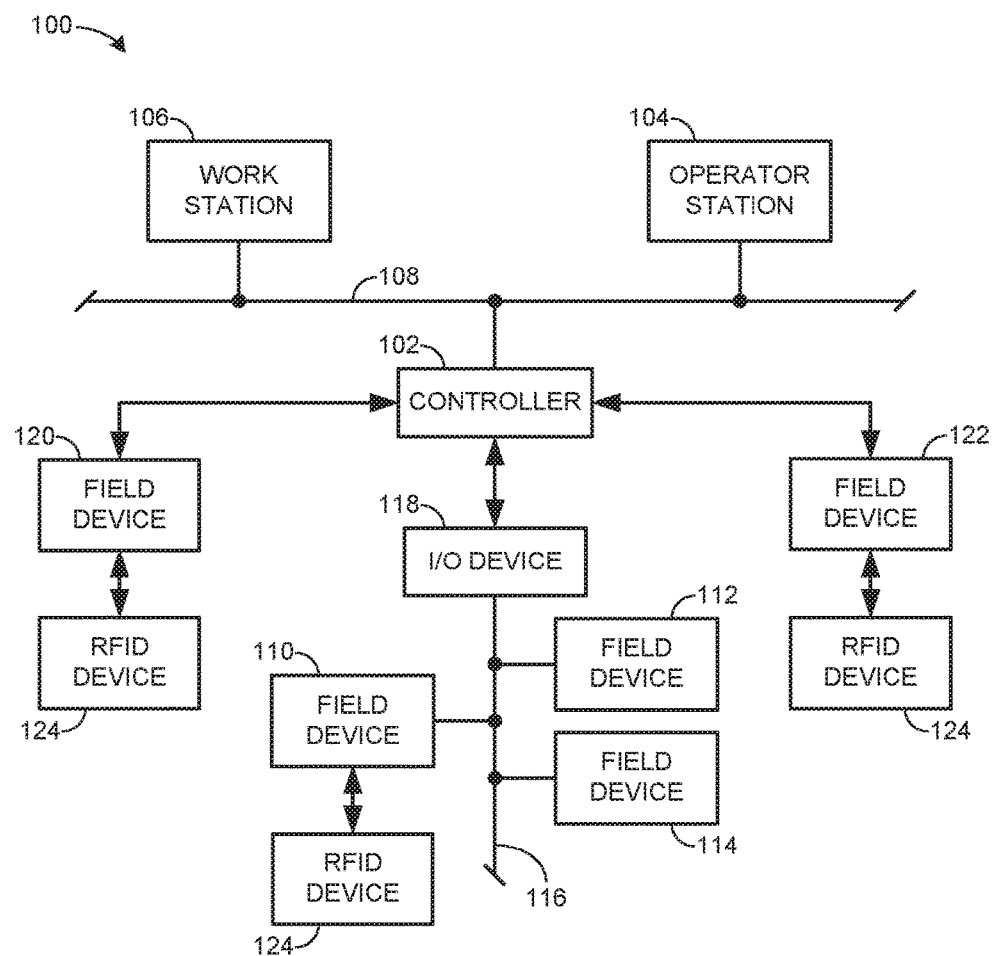
FIG. 1 is a schematic illustration of an example process control system within which the teachings of this disclosure may be implemented.

While field devices located throughout a process control system may be monitored, along with their corresponding parameters, from a central, remotely located control room, there are circumstances where operators, engineers, and/or other plant personnel are located in the field near the field devices such as, for example, during the inspection, maintenance and/or repair of field devices and/or other control elements within a process plant. Frequently, maintenance and repair is a planned and time-driven plant activity dependent upon swift access to detailed plant information. When field devices and/or final control elements fail, the inability to access technical information necessary to complete the repairs while plant personnel are located in the field near such components can result in costly waste and/or lost production. More reliable equipment and predictive maintenance via prognostic algorithms are goals in current maintenance concepts that require access to robust maintenance and repair information.

Such maintenance programs are often plagued with records and parts ordering systems that contain misfiled, out-of-date, incomplete and/or inaccurate records. Further, without an integrated enterprise solution, data can be located in multiple physical locations and/or housed in electronic data records that are not quickly accessible by maintenance personnel during a walk-down. As part of a typical walk-down, every piece of equipment is examined, and nameplate specifications, such as model and serial numbers, are recorded. A detailed set of attributes for each type of equipment also is collected.

Additionally, in maintenance situations where local replacement of a field device is required, device configuration and commissioning can become a significant issue. Specifically, field devices that include embedded microprocessors and/or microcontrollers may have complex configurations that require maintenance technicians to reference technical data stored remotely throughout the enterprise solution. In many such situations, technicians may rely on written records that may not be up to date and/or may be otherwise incomplete. Further, in circumstances where technicians connect to the enterprise solution to retrieve the needed technical data, access to the data can be slow (e.g., based on the communication protocols implemented throughout the enterprise to convey data). Accordingly, in such situations, among other situations where plant personnel are local to the field devices, it is desirable to enable the plant personnel to communicate with the field devices that are able to store relevant technical data locally to provide complete and up to date information without depending upon slow communication speeds to retrieve the same information stored at a remote site.

In some instances, plant personnel carry portable handheld communicators with which they may communicate with and/or interrogate a device of interest. However, in many such instances, physically connecting a portable communicator device to a field device requires the plant personnel to, for example, unscrew and remove a terminal cap of the field device. As a result, access is typically limited to field devices that are out of service because removing a terminal cap from a currently operating field device (i.e. a field device in service) would violate plant safety standards. To overcome this obstacle, intrinsically safe wireless transceivers have been implemented to communicate with field devices and then wirelessly transmit the data elsewhere, such as, for example, a handheld wireless receiver carried by nearby plant personnel.

Although wireless transceivers are an improvement, currently known wireless transceivers suffer from several limitations. For example, many known wireless transceivers rely on power from the control system (e.g., loop power) provided to the corresponding field device to charge batteries and/or capacitors to power wireless transmissions. As many field devices are implemented on a tight power budget as a result of the low voltage signal provided by the power from the control system, wireless communications by many known wireless transceivers are limited to periods of time where sufficient power is available and/or after a period of time where sufficient power has been scavenged from the control system power provided to the field device. As such, many known wireless transceivers are not conducive to high speed communications and/or transfers of significant amounts of data. Further, some devices may use solar power to charge capacitors. However, solar power may not always be reliable depending upon the location and/or environment in which the device is being implemented. Additionally, many known wireless transceivers are in serial communication with a wired modem associated with the particular communication protocol implementing the interaction of field devices within the process control system. As a result, the communication speed of the wireless transceivers is limited to the communication speed of the corresponding protocol, which can be relatively slow (e.g., the well-known HART protocol is limited to 1200 baud). Further, because known wireless transceivers typically rely on control system power to function, wireless transmissions are only possible when the process plant is running and the particular field device is not otherwise unpowered (e.g., not placed out of service due to maintenance). Furthermore, many devices cannot be shipped or transported with batteries such that when these devices are taken out of service to be shipped off for repairs, there is no power source with which to communicate with the devices.

The above obstacles are overcome and high speed local communications with a field device, among various other advantages, are realized through the implementation of the teachings disclosed herein and developed more fully below. In particular, the teachings disclosed herein achieve wireless communications through the use of radio-frequency identification (RFID), which is an extremely energy efficient technology. For example, ultra-high frequency (UHF) passive RFID tags receive power from an electromagnetic field (EMF) generated from a nearby handheld RFID reader (e.g., typically within a distance of approximately 30 feet). Semi-passive RFID tags use local power (e.g., a battery) to power internal circuits, but still rely on power from a handheld RFID reader for communication to the reader. With the reliance on local power for communications, semi-passive RFID tags can have longer read ranges than passive RFID tags (e.g., up to 90 feet). Active RFID tags use local power to power both internal circuits and to communicate with a reader. As such, active RFID tags exhibit significantly longer transmission ranges (e.g., up to 1000 feet).

Different implementations of RFID technology depend upon various engineering tradeoffs of features relevant to the particular industry in which the technology is being applied. Such tradeoffs are accomplished by balancing features such as read range, write range, cost, battery life, service life, allowable temperature range, weather resistance, etc. In the context of the process control industry, some of the performance parameters of particular interest include long distance read/write range, high reliability, and large data capacity. To achieve long ranges, far field or ultra high frequency (UHF) RFID technology may be implemented. However, the longer the range of communications the greater the limit on memory capacity (if implementing passive RFID tags) or the greater power requirements (if implementing semi-passive or active RFID tags). Examples disclosed herein achieve certain balances between these features that are suitable to applications within the process control industry.

In some disclosed examples, a passive RFID tag is physically and operatively coupled to a field device within a process control system. Once data from the field device is gathered, in some such examples, the RFID tag may transmit the data to a nearby handheld RFID reader based on power received from an EMF of the reader. As such, plant personnel local to the field device can wirelessly access data associated with the field device (e.g., data previously communicated from the field device to the RFID tag or an associated memory) in a manner that maintains the plant safety policy by avoiding the need to unscrew and remove a terminal cap. Additionally, plant personnel can wirelessly access data associated with a field device located beyond safety boundaries and/or otherwise out of direct access by plant personnel (e.g., placed up high on a tower or behind other equipment). Furthermore, in such examples, because the RFID tag is passive (e.g., does not use any power other than from the handheld RFID reader), plant personnel may communicate with the RFID tag regardless of power being provided to the corresponding field device. Thus, plant personnel can communicate with the RFID tag when the field device is operating, when the field device or plant is down, and even when the field device is removed from the plant (e.g., for repairs, before installation, etc.). In some examples, plant personnel local to the field can wirelessly communicate with (e.g., interrogate, calibrate, etc.) the field device with a handheld reader via the RFID tag.

In some disclosed examples, a semi-passive RFID tag is physically and operatively coupled to a field device within a process control system. In such examples, the RFID tag may draw power from the power provided by the control system to operate and communicate with the field device. In some examples, the power is drawn from 4-20 mA analog signals sent along wires to the field device commonly referred to as loop power. In other examples, the power is drawn from wires along a 24 volt digital bus commonly referred to as network power or bus power. As used herein, loop power and network power are collectively referred to as control system power.

In some examples, the tradeoff between communication range and memory capacity for semi-passive RFID tags is somewhat alleviated because the supplemental power source (e.g., control system power) can power the memory and corresponding processor of the tag. In this manner, a higher capacity memory can be used. Further, with the memory and processor of the RFID tag being control system powered, an EMF from a handheld RFID reader can be used to solely power the antenna, thereby achieving longer communication ranges. For example, a passive RFID tag (that is powered solely by an EMF generated by the RFID reader) may have a range extending up to about 30 feet, whereas a semi-passive RFID tag (that is battery assisted or receives other auxiliary power such as control system power) may have a range extending a distance up to about 90 feet. While these ranges are possible, some RFID tags may be characterized by longer or shorter ranges depending upon the particular RFID tag based upon other design considerations (e.g., cost, size, etc.).

Thus, by taking advantage of control system power (e.g., in a semi-passive tag implementation), which is available in most all process control system environments, increased memory capacity and increased communication ranges are possible. Furthermore, read ranges near 90 feet, as described above, are likely to enable plant personnel to be within range of almost any field device regardless of its location (e.g., beyond safety boundaries, up a tower, etc.). Further, semi-passive RFID tags can communicate omni-directionally such that plant personnel do not have to be at a particular location within the transmission range to communicate with an RFID tag associated with a field device. Additionally, while semi-passive RFID tags are designed to operate with supplemented power (e.g., control system power), such tags may also be operated in a fully passive mode (e.g., when there is no control system power). However, if higher memory has been incorporated into such tags in reliance on the availability of control system power (e.g., the RFID tags are expected to primarily operate in a semi-passive mode), the communication range of the tag when in a passive mode may be significantly reduced to a short range (e.g., one foot or less). Thus, while communications with such RFID tags are possible without control system power, such communications may be limited to when the handheld RFID reader can be brought next to the field device (e.g., when in front of a technician for repairs). Thus, the example methods and apparatus disclosed herein that use the different passive or semi-passive implementations present different tradeoffs between memory and communication range in settings both where control system power is available and where such power may be unavailable. Additionally or alternatively, in some examples, near field communications (e.g., based on magnetic induction) are used to communicate with an RFID tag that has no other power source. Such examples, typically involve the RFID reader being positioned within a few inches and up to about one foot of the RFID tag. As such, the close proximity in such examples provides greater security as an operator accessing the RFID tag with a reader must be right next to the tag.

Furthermore, while passive RFID tags typically have limited onboard memory, in some examples, as data is gathered from the field device, the data is stored in a separate non-volatile memory that is accessible by the RFID tag when needed based on a request via a portable RFID reader/writer. By gathering and storing the data in this manner, the data is effectively cached for quick retrieval without the limitation of slow communications based on the power consumption requirements of other known wireless transceivers and/or based on the requirements of the communication protocol implemented within the process control system. Further, the separate non-volatile memory provides extra memory for a corresponding field device, which may be used to store additional information related to the identification, maintenance, and/or commissioning of the field device to assist in maintaining and/or repairing faulty devices. In some examples, communications from a central control room may also be written to the non-volatile memory for retrieval by plant personnel during a walk-down and/or at any other time. Additionally, in some examples disclosed herein, the RFID tags are associated with a modem to communicate with the field device, and/or the rest of the process control system according to the particular communications protocol implemented in the control system (e.g., HART). Further, in some examples, a portable RFID reader/writer can be used to update and/or provide additional information to the non-volatile memory for subsequent reference and access. Additionally, in some examples the writing of data to the non-volatile memory and the corresponding access of the data is implemented using asymmetric cryptography to certify and/or authenticate the validity of the data. Further, in some examples, the RFID tag is fully active such that the antenna is also control system powered and, thereby, enabled to broadcast signals and achieve even greater ranges.

FIG. 1 is a schematic illustration of an example process control system 100 within which the teachings of this disclosure may be implemented. The example process control system 100 of FIG. 1 includes one or more process controllers (one of which is designated at reference numeral 102), one or more operator stations (one of which is designated at reference numeral 104), and one or more work stations (one of which is designated at reference numeral 106). The example process controller 102, the example operator station 104 and the example work station 106 are operatively coupled via a bus and/or local area network (LAN) 108, which is commonly referred to as an application control network (ACN).

The example operator station 104 of FIG. 1 allows an operator, engineer, and/or other plant personnel to review and/or operate one or more operator display screens and/or applications that enable the plant personnel to view process control system variables, states, conditions, alarms; change process control system settings (e.g., set points, operating states, clear alarms, silence alarms, etc.); configure and/or calibrate devices within the process control system 100; perform diagnostics of devices within the process control system 100; and/or otherwise interact with devices within the process control system 100.

The example work station 106 of FIG. 1 may be configured as an application station to perform one or more information technology applications, user-interactive applications and/or communication applications. For example, the work station 106 may be configured to perform primarily process control-related applications, while another work station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example work station 106 of FIG. 1 may be implemented using one or more work stations and/or any other suitable computer systems and/or processing systems. For example, the operator station 104 and/or work station 106 could be implemented using single processor personal computers, single or multi-processor work stations, etc.

The example LAN 108 of FIG. 1 may be implemented using any desired communication medium and protocol. For example, the example LAN 108 may be based on a hardwired and/or wireless Ethernet communication scheme. However, any other suitable communication medium(s) and/or protocol(s) could be used. Further, although a single LAN 108 is illustrated in FIG. 1, more than one LAN and/or other alternative pieces of communication hardware may be used to provide redundant communication paths between the example systems of FIG. 1.

The example controller 102 of FIG. 1 may be, for example, a DeltaV™ controller sold by Fisher-Rosemount Systems, Inc., an Emerson Process Management company. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other plant personnel using the operator station 104 and which have been downloaded to and/or instantiated in the controller 102.

As shown in the illustrated example of FIG. 1, the example controller 102 may be coupled to a plurality of smart field devices 110, 112, 114 via a data bus 116 and an input/output (I/O) gateway 118. The smart field devices 110, 112, 114 may be Fieldbus compliant instruments, transmitter, sensors, etc., in which case the smart field devices 110, 112, 114 communicate via the data bus 116 using the well-known Foundation Fieldbus protocol. Of course, other types of smart field devices and communication protocols could be used instead. For example, the smart field devices 110, 112, 114 could instead be Profibus and/or HART compliant devices that communicate via the data bus 116 using the well-known Profibus and HART communication protocols. Additional I/O devices (similar and/or identical to the I/O gateway 118) may be coupled to the controller 102 to enable additional groups of smart field devices, which may be Foundation Fieldbus devices, HART devices, etc., to communicate with the controller 102.

In addition to the example smart field devices 110, 112, 114, coupled via the I/O gateway 118, one or more smart field devices 122 and/or one or more non-smart field devices 120 may be operatively coupled to the example controller 102. The example smart field device 122 and non-smart field device 120 of FIG. 1 may be, for example, conventional 4-20 milliamp (mA) or 0-24 volts direct current (VDC) devices that communicate with the controller 102 via respective hardwired links. In such examples, the hardwired links enable the field device 120 to communicate with the controller 102 and provide electrical power (e.g., loop power, network power) to the field device 120.

Figure 2:
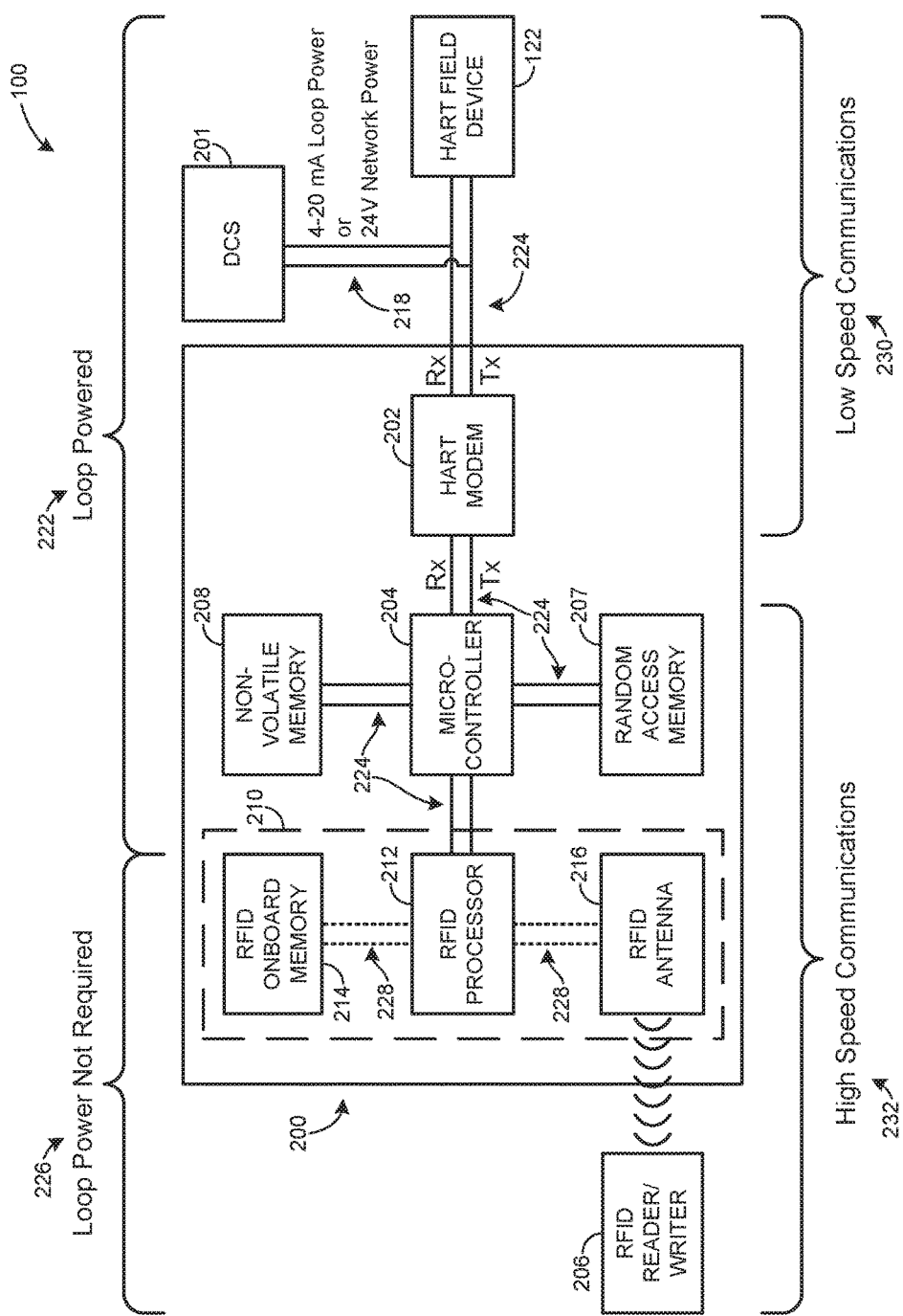
FIG. 2 illustrates an example manner of implementing the example RFID device of FIG. 1.

Additionally, each of the field devices 110, 120, 122 is shown in the illustrated example of FIG. 1 coupled to a corresponding RFID device 124. With respect to the smart field devices 110, 122 in the illustrated example, the corresponding RFID device 124 may convert (e.g., via a modem) outbound data obtained from the field devices 110, 122 (e.g., parameter values, diagnostic information, etc.) according to a particular communication protocol associated with the field devices 110, 122 (e.g., HART, Profibus, Foundation Fieldbus, etc.) for transmission to an RFID reader/writer 206 (FIG. 2). Additionally, in some examples, the RFID device 124 may convert (e.g., via the modem) inbound data obtained from the RFID reader/writer 206 to be transmitted to the field devices 110, 122 and/or other components of the process control system 100 according to the particular communications protocol. In some examples, the RFID device 124 does not include a modem and simply records data obtained from the smart field devices 110, 122 and/or the non-smart field device 120 directly to memory for transmission to the RFID reader/writer 206. In addition to storing and/or communicating process control data, in some examples, the RFID device 124 stores other information (e.g., maintenance records (e.g., alert logs, diagnostic test results, and/or other diagnostic information indicative of the operational health of the field device), parts lists, serial card information, specification sheet, photographs, etc.) associated with the corresponding smart field device 110, 122 or non-smart field device 120 as described in further detail below. In some examples, such information is also communicated to the RFID device 124 via the corresponding field device. Additionally or alternatively, in some examples, such data is communicated via the RFID reader/writer 206. In some examples, communications between the RFID device 124 and the RFID reader/writer 206 are powered by the RFID reader/writer 206 (e.g., the EMF of the RFID reader/writer 206 powers the RFID device 124). Accordingly, the RFID device 124 enables plant personnel to communicate locally and wirelessly with the field devices 110, 120, 122 without power consumption requirements that may decrease the power efficiency of the process control system (e.g., by drawing on the control system power)

and/or increase maintenance costs (e.g., by requiring the acquisition and/or replacement of batteries). In other examples, the RFID device 124 is at least partially powered via the process control system (e.g., in a semi-passive RFID mode), thereby enabling communications over longer ranges and allowing for greater memory space. In other examples, the RFID device 124 is fully powered via the process control system (e.g., in an active RFID mode), to enable the antenna to broadcast transmissions rather than back scattering a signal from the RFID reader/writer. In such examples, significantly longer communications ranges are possible (e.g., up to 1000 feet).

Example manners of implementing the RFID device 124 in accordance with the teachings described herein are shown and described below in connection with FIGS. 2 and 3. It should be appreciated that a single RFID device 124 may be used to interact with more than one of the field devices 110, 112, 114, 120, 122 by moving the RFID device 124 from one device to another as dictated by the circumstances of the process system and the particular needs of plant personnel. Additionally or alternatively, as shown in FIG. 1, multiple RFID devices may be connected to any or all of the field devices 110, 112, 114, 120, 122. More particularly, in some examples, each field device 110, 112, 114, 120, 122 (or at least some of the field devices) are coupled to a separate RFID device 124 and remain coupled to the corresponding RFID device 124 throughout an entire lifecycle, or portion thereof, of the field device. In some such examples, the RFID device 124 contains a non-volatile memory 208 (FIG. 2) separate from any memory internal to the corresponding field device 122. In such examples, the RFID device 124 is capable of storing serial card data and/or any other data associated with the identification, maintenance, configuration, and/or operation of the field device 122. Typically, the memory within a field device is relatively limited such that much of this information (e.g., documentation and historical records of maintenance, repairs, parts replacements, etc.) has been remotely stored at a central maintenance database for the entire enterprise. However, by coupling the RFID device 124 with its own non-volatile memory 208 in accordance with the teachings disclosed herein, this information can be accessed quickly and easily by plant personnel local to the field device (e.g., during a walk-down) with an RFID reader/writer 206. Furthermore, in such examples, the information associated with the field device 122 stored on the RFID device 124 is accessible even when the field device 122 is taken out of service and/or removed from the plant environment (e.g., when shipped off for repairs). Additionally, as described in greater detail below, in some examples, at least some of the information may be stored in an onboard memory of an RFID tag 210 (FIG. 2) within the RFID device 124 such that the information can be accessed without a power source to the field device 122 (e.g., when the RFID tag 210 is functioning in a passive mode).

While FIG. 1 illustrates an example process control system 100 within which the methods and apparatus to communicate with process control system field devices using an RFID device described in greater detail below may be advantageously employed, the methods and apparatus described herein may, if desired, be advantageously employed in other process plants and/or process control systems of greater or less complexity (e.g., having more than one controller, across more than one geographic location, etc.) than the illustrated example of FIG. 1.

FIG. 2 illustrates an example RFID device 200 that may be used to implement the example RFID device 124 of FIG. 1. In the illustrated example, the RFID device 200 is connected to the field device 122 of the process control system 100 of FIG. 1 (the remainder of which is represented by the distributed control system (DCS) block 201). In the illustrated example, the RFID device 200 includes a HART modem 202, a microcontroller 204 associated with a random access memory (RAM) 207 and a non-volatile memory 208. The RFID device 200 also includes an RFID tag 210 that comprises a main RFID processor 212, an RFID onboard memory 214 (also a form of non-volatile memory), and an RFID antenna 216. In some examples, the RFID processor 212, the RFID onboard memory 214, and the RFID antenna 216 are all incorporated onto a single integrated circuit (IC).

In the illustrated example of FIG. 2, the field device 122 is identified as a HART-compliant field device. As stated above, the teachings of this disclosure may be implemented in connection with a field device associated with any suitable communication protocol (e.g., Fieldbus, Profibus, etc.). However, the following disclosure is explained by way of example in terms of the HART communication protocol. Thus, as shown in FIG. 2, the HART field device 122 is operatively coupled to the DCS 201 via a pair of signal wires 218 (represented by the two solid lines) to communicate according to the HART protocol. In addition to transmitting and receiving control signals over the signal wires 218, the field device 122 also draws its power from the signal wires 218 (e.g., the field device is control system powered, which in the context of the HART protocol means 4-20 mA loop powered and in the context of the Fieldbus protocol means 24 V network power). Additionally, in the illustrated example, the RFID device 200 is linked to the signal wires 218 such that the HART field device 122 is operatively coupled to the RFID device 200 via the HART modem 202 and to enable the RFID device 200 to draw power from the control system power provided via the signal wires 218. In some examples, communications are sent and/or received between the RFID device 200 and the field device 122. Additionally or alternatively, in some examples, communications are sent and/or received between the RFID device 200 and the DCS 201. In such examples, communications from the RFID device 200 relative to communications from the field device 122 are managed and/or distinguished by the DCS 201 based on individual addresses assigned to each of the RFID device 200 and the field device 122 (e.g., in a multi-drop configuration). That is, in such examples, the RFID device 200 and the field device 122 are treated as two separate instruments within the process control system 100 connected along the 2-wire connection 218. In some examples, the RFID device 124 may be coupled to a HART compliant field device although the DCS 201 is not implemented using the HART protocol. In such examples, the RFID device 200 may not communicate with the DCS 201 but would communicate with the field device. Although the RFID device 200 in FIG. 2 is shown as being independently connected to the signal wires 218, in some examples, the RFID device 200 is coupled to the signal wires 218 via the field device 122 as will be described more fully below in connection with FIG. 5.

The example HART modem 202 is configured to transmit information from the HART field device 122 according to the HART protocol (or any other suitable communication protocol) to the microcontroller 204 according to a serial communication protocol (e.g., universal serial bus (USB), Ethernet, synchronous serial (e.g., serial peripheral interface (SPI) bus), etc.). Additionally, the example HART modem 202 is configured to transmit information from the microcontroller 204 according to the serial communication protocol to the HART field device 122 and/or to the DCS 201 according to the HART protocol.

The example microcontroller 204 controls the timing and/or scheduling of data sent to and/or from the field device 122 and/or the RFID tag 210. In some examples, the data includes requests to poll information (e.g., process variable values, alarms, etc.) from the field device 122. In other examples, the data includes commands instructing the field device 122 to implement certain functionality (e.g., tuning, calibration, diagnostics, commissioning, etc.). Data received by the microcontroller 204 of the illustrated example may be stored temporarily in the RAM 207 and/or stored long-term in the non-volatile memory 208. Additionally or alternatively, the data received by the microcontroller 204 may be sent to the RFID processor 212 for subsequent storage in the corresponding RFID onboard memory 214 and/or transmitted to an external RFID reader/writer 206 via the RFID antenna 216.

As identified by brace 230, communications between the field device 122, the HART modem 202 of the RFID device 200, and the DCS 201 are relatively slow or low speed because the communications are governed by the HART protocol, which is limited to about 1200 baud. In contrast, the communications between the other elements illustrated in FIG. 2, as identified by brace 232, are relatively high speed in that they are based on a high speed serial communication protocol (e.g., SPI bus), which may achieve approximately 115 kbps. Thus, by implementing the example RFID device 200 in accordance with the teachings disclosed herein, relatively slow HART based communications may be monitored overtime and cached or stored in the non-volatile memory 208 and/or the RFID onboard memory 214 for subsequent access by plant personnel handling an RFID reader/writer (e.g., the RFID reader/writer 206 shown in FIG. 2) at a much faster rate via the serial bus communication protocol.

In some examples, as identified by brace 222, the communications associated with the field device 122, the HART modem 202, the microcontroller 204, the non-volatile memory 208 and the random access memory 207 (represented in FIG. 2 by solid lines 224) require power from the DCS 201 via the signal wires 218 to operate (i.e., these components are loop powered). In contrast, as identified by brace 226, the communications within the RFID tag 210 (represented by dotted lines 228) and the wireless communication between the RFID antenna 216 and the RFID reader/writer 206 do not require control system power (e.g., loop power). Rather, the RFID communications in the illustrated example (e.g., those identified by the dotted lines 228) draw power from the RFID reader/writer 206 via inductive or radiative coupling. Thus, not only can the RFID tag 210 function without loop power, the RFID tag 210 can function without a battery supply or charged capacitors (e.g., which may be charged based on available loop power) such that data stored in the RFID onboard memory 214 of the RFID tag 210 is accessible any time the RFID reader/writer 206 is within range of the antenna 216. Additionally or alternatively, in some examples, the RFID device 200 is provided with a battery supply and/or capacitor for redundancy or backup power when control system power is unavailable.

In some examples, the amount of data that can be stored onboard the RFID tag 210 (e.g., within the RFID onboard memory 214) is relatively limited because it is to be powered by the RFID reader/writer 206. For example, many known passive RFID tags typically have an upper memory threshold of 32 kilobytes. However, with RFID technology there is a tradeoff between the amount of memory available and the range over which data stored on the memory can be accessed wirelessly via an RFID reader/writer. For example, using the 32 kilobytes of memory may limit the RFID communication range to around 2 feet, whereas smaller amounts of memory (e.g., 512 bits) can allow ranges exceeding 30 feet (the range may also depend upon the antenna design of the RFID tag). In some examples, a range of 2 feet may be acceptable. However, in other examples, where a field device is not readily accessible by plant personnel in the field (e.g., is placed up high, located behind other equipment, beyond safety boundaries, etc.), the RFID onboard memory 214 of the RFID tag 210 corresponding to such a field device may only contain 512 bits of data, which enables a range of approximately 30 feet. Accordingly, the terms "local," "near," "nearby," and related terms associated with the location or position of plant personnel and/or an RFID reader/writer relative to a field device are expressly defined as being within the maximum range of communication between the RFID reader/writer and an RFID device physically coupled to the corresponding field device.

While the memory of the RFID tag 210 (e.g., the RFID onboard memory 214) is relatively limited, the non-volatile memory 208 associated with the microcontroller 204, in some examples, can be any size (e.g., megabytes or even gigabytes of memory) within the constraints of manufacturing capabilities. In some examples, the non-volatile memory 208 is removable and replaceable (e.g., like an SD card) to enable the end user to select the desired amount of memory. In this manner, additional information related to the field device 122 can be stored that may otherwise be unavailable due to the limited memory space of the field device 122. For instance, in some examples, the non-volatile memory 208 stores maintenance and/or repair information gathered over the entire lifecycle of the field device 122 (or any portion thereof). Such information may include recommended parts lists, photos, model/serial number of the field device and/or associated parts, maintenance instructions and/or procedures, as well as a historical archive of the nature and timing of any device failures and resulting maintenance response (e.g., error signals, alerts/alarms, diagnostic test results, part replacements, etc.). In this manner, whenever maintenance technicians are examining the field device (e.g., during a routine walk-down, because of a device failure, or as part of turnaround planning), they will have immediate and ready access to all relevant information to be able to assess the situation and/or implement appropriate next steps. Furthermore, in this manner, the same relevant information is even accessible if the device has been removed and relocated from the plant for the purposes of repair and/or more exhaustive diagnostic testing.

Further, as shown in the illustrated example, the communication between the microcontroller 204 and the RFID processor 212 uses loop power such that not everything that can be stored in the non-volatile memory 208 associated with the microcontroller 204 will be available to the RFID tag 210 when there is no power. Accordingly, in some examples, a subset of the data obtained from the field device 122 that is likely to be of the most benefit when there is no power is stored directly on the RFID tag 210 (e.g., in the RFID onboard memory 214) as is described more fully below. Even though it is unlikely that the RFID tag 210 can store all data gathered from the field device 122 because the amount of memory required exceeds the memory available in the RFID onboard memory 214, caching the data from the non-volatile memory 208 still provides the advantage of wirelessly accessing the data (via the RFID reader/writer 206) at communications speeds much higher than possible if the field device 122 were polled directly, which is subject to the relatively slow communication speed of the HART protocol. However, in the illustrated example, loop power is used to enable the RFID tag 210 to communicate with the microcontroller 204 and access the non-volatile memory 208. Thus, when the microcontroller 204 and the non-volatile memory 208 are loop powered, the RFID reader/writer 206 may access all of the data stored on the non-volatile memory 208 via the RFID tag 210 regardless of whether the data is also stored on the RFID onboard memory 214.

Implementing communications via RFID technology in accordance with the teachings disclosed in connection with FIG. 2 has several advantages. First, RFID transmissions can occur whenever they are desired and plant personnel have an RFID reader/writer that is within a suitable range. That is, RFID communications between the RFID tag 210 and the RFID reader/writer 206 of the illustrated example are not dependent on the process control system 100 being in operation and powered up. In contrast, other known wireless radio transceivers used in process control systems (e.g., based on a ZigBee communication protocol) require a significant amount of power, which is often scavenged from available loop power provided to the corresponding field device over time until capacitors associated with the transceiver are sufficiently charged to power a signal transmission. Due to the tight power budget frequently associated with the low voltage power source provided to field devices, a delay of up to a minute may be needed to harvest sufficient power to transmit a HART command. Under such constraints, the types (and amounts) of wireless communications possible are significantly limited (e.g., to providing basic control information such as values for process variable, and/or other key parameters). For example, diagnosing and/or configuring a HART field device can involve well over 1000 HART commands. At approximately one HART command per minute, ZigBee based wireless transceivers are not practical for such purposes. However, as RFID technology uses no other power than what is provided by an RFID reader/writer (e.g., in a passive mode), data can be freely communicated whenever the RFID reader/writer is within range of the antenna of an RFID tag.

Another advantage of using the RFID tag 210 of the illustrated example to enable wireless communications is that such communications can be carried out even if the DCS 201 is shut down, the field device 122 is taken out of service, and/or power is otherwise cut off. Thus, not only can the RFID tag 210 communicate with the RFID reader/writer 206 when the field device 122 is without power, the same communications are still available even when the field device is taken offsite (e.g., when being shipped off for repairs) and/or before being installed and commissioned into a control system. Inasmuch as such communications are made without loop power, the corresponding data in such examples is stored onboard the RFID tag 210 (e.g., in the RFID onboard memory 214). In such examples, due to the memory constraints of the RFID tag 210, only the data that is most likely to be desired when there is no power is stored in the RFID tag 210 (any additional data gathered from the field device 122 may be stored in the non-volatile memory 208). In some examples, the data stored in the RFID tag 210 is associated with the identification (e.g., serial card data), maintenance (e.g., historical records of repairs, part replacements, diagnostic tests, etc.), and/or commissioning and/or configuring (e.g., operational settings and/or tuning parameters) of the field device 122. Storing such information on the RFID tag 210 is advantageous because the data can be used to improve the accuracy and speed with which the field device 122 may be repaired (many cases of which involve the field device being unpowered). For example, by storing the serial number of the field device 122 on the RFID tag 210 (which, in some examples, is physically attached to the field device even during shipping for repairs), the field device 122 can be identified during the shipping process (e.g., when it is crated on a truck) to reduce the potential of the field device 122 becoming lost and/or confused with another device.

Further, in some examples, the maintenance data associated with the field device 122 stored on the RFID onboard memory 214 of the RFID tag 210 may include the date of manufacture, part numbers and/or a parts list (e.g., based on an engineering master (EM) string to reduce memory requirements), spare parts recommendations, a specification sheet, images/photos of the field device 122 and/or corresponding parts, and/or maintenance records (e.g., the date of last maintenance and/or calibration, the date when the field device 122 was first installed, the date(s) of diagnostic tests and their results, alert logs, etc.). In accordance with the teachings disclosed herein, any or all of the above forms of maintenance data may be accessible before the field device 122 is coupled to a power supply to facilitate the ordering of parts and/or the speed at which issues may be assessed and ultimately repaired.

Further, the communication speed of wireless transmissions using the RFID tag 210 is much faster than other known wireless transceivers in a process control system. For example, in a wireless HART context, known transceivers are typically configured in serial communication with a wired HART modem such that the transceiver is limited to the speed of the HART protocol associated with the modem (e.g., 1200 baud). In contrast, the RFID device 200 of FIG. 2 is configured according to a high speed serial bus communication protocol that provides much faster communications. Thus, while communications that are associated with data stored in the non-volatile memory 208 depend upon loop power, the speed at which data (previously polled from the field device 122) can be accessed is a significant improvement over polling the field device 122 directly.

A related advantage of the RFID device 200 arises from the fact that high speed communications are possible while the field device is powered. Frequently there is a no-touch rule in effect for process control equipment when the process is in operation such that engineers or other maintenance personnel can only access alerts, alarms, or diagnostic data for a field device via the plant database. While this information is accessible from a control room and/or remote terminal in a maintenance shop, such information is largely unavailable when personnel are local to the field device because known wireless transceivers are limited (e.g., by the speed/frequency of communications, as described above) and establishing a hardwired connection to a field device may require unscrewing a terminal cap (which may violate a plant safety policy) and/or taking the field device out of service, thereby disrupting operations of the plant. However, with the example RFID device 200, the high communication speeds and the wireless nature of the communications overcomes these obstacles for personnel with a handheld RFID reader/writer (e.g., the RFID reader/writer 206) at or near the location of the field device 122.

Additionally, in some examples, the RFID tag 210 may store the particular asset tag for the field device 122 and/or other data related to commissioning and/or configuring the field device 122. Generally, when a field device is commissioned or configured, a field technician executes a series of tests to verify the functionality of the field device and subsequently configures and calibrates the field device by storing operational settings in the field device for installation into the process plant. In some examples, such operational settings to configure and calibrate the field device are stored within the RFID onboard memory 214 of the RFID tag 210. In such examples, should the field device fail or otherwise need replacing, plant personnel can quickly retrieve the operational settings from the failed device (via the RFID reader/writer 206) and load them on another RFID tag 210 corresponding to a replacement field device. In other examples, the RFID device 200 may be taken from the removed field device and coupled to the replacement field device to provide the stored operational settings directly to the new replacement device. By implementing either of the above examples, the time efficiency for switch outs of replacement field devices may be significantly improved. That is, the typically manual process of validating and/or populating variables and other parameters to commission and configure the field device 122 can be automated to significantly reduce labor costs and improve accuracy by reducing written errors. Furthermore, in some examples, a field device (e.g., the field device 122) may be temporarily replaced or removed from service while it is repaired before being re-installed within the process system. In some such examples, if any data associated with the field device 122 changes after being repaired, the memory in the RFID tag 210 may be updated (while the field device 122 is powered) such that the new information is accessible (via the RFID reader/writer 206) before the field device 122 is re-installed and re-commissioned in the process control system 100.

Figure 3:
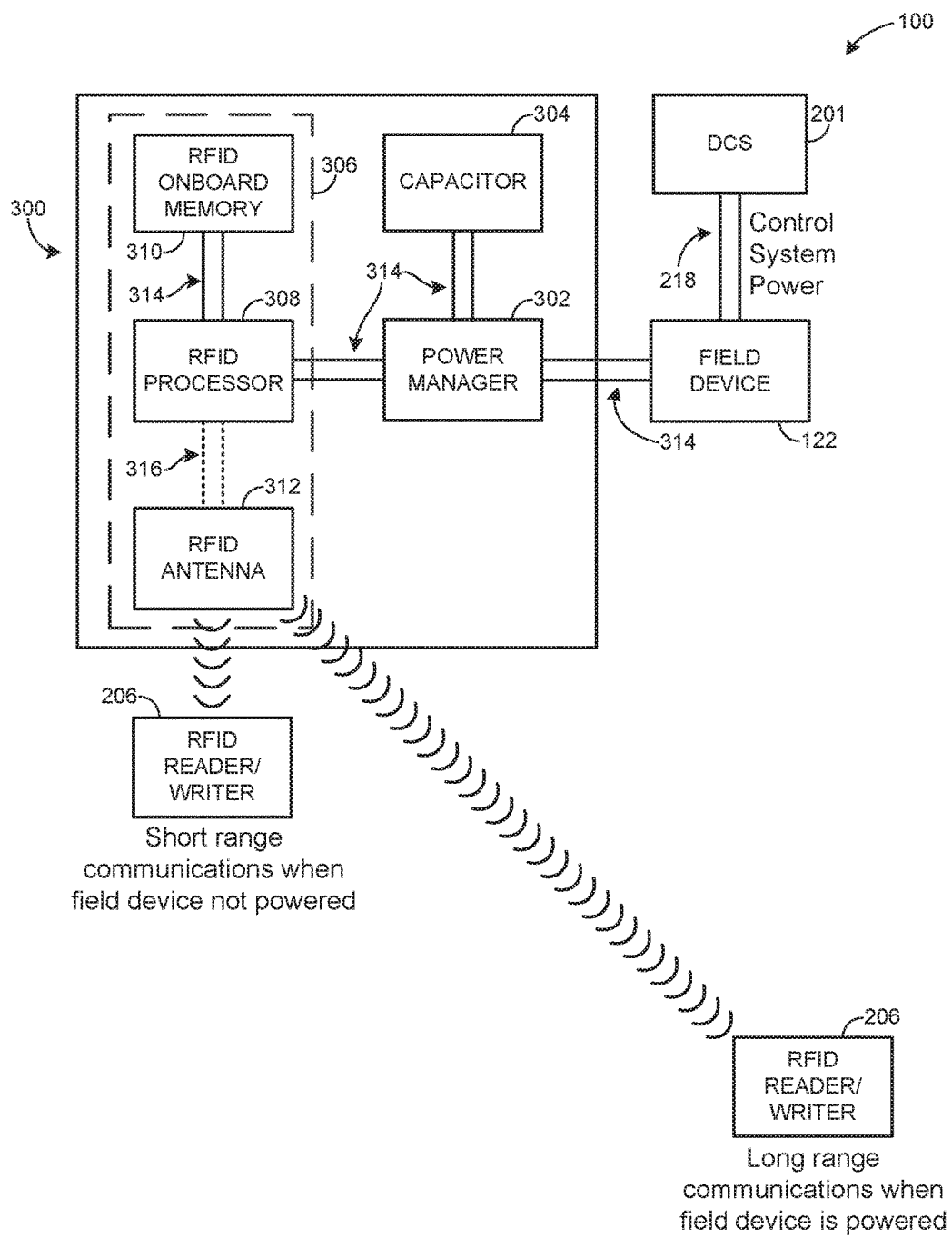
FIG. 3 illustrates another example manner of implementing the example RFID device of FIG. 1.

FIG. 3 illustrates another example RFID device 300 that may be used to implement the example RFID device 124 of FIG. 1. As with FIG. 2, the RFID device 300 of FIG. 3 is shown connected to the field device 122 of the process control system 100 of FIG. 1 (the remainder of which is represented by the DCS block 201). In the illustrated example, the RFID device 300 includes a power manager 302, a capacitor 304, and an RFID tag 306 that comprises a main RFID processor 308 and an RFID onboard memory 310, and an RFID antenna 312. In some examples, the RFID processor 308, the RFID onboard memory 310, and the RFID antenna 312 are all incorporated onto a single integrated circuit (IC).

Similar to the field device 122 shown in FIG. 2, the field device 122 in the illustrated example of FIG. 3 is operatively coupled to the DCS 201 via the signal wires 218 (represented by the two solid lines) through which control signals are transmitted and power is provided to the field device 122. Further, in the illustrated example of FIG. 3, the RFID device 300 is linked to the signal wires 218 such that the field device 122 is operatively coupled to the RFID device 300 to enable the RFID device 300 to receive data sent from the field device 122. Additionally, the coupling of the example RFID device 300 to the signal wires 218 enables the RFID device 300 to draw off power provided to the field device 122. More particularly, as shown in FIG. 3, the RFID device 300 is coupled to the signal wires 218 via the field device. In some examples, such as when the signal wires 218 corresponds to a 24 volt digital bus (e.g., network powered) to implement the Foundation Fieldbus protocol, the RFID device 300 is connected to the signal wires 218 in parallel with the field device 122 (similar to the connection shown for the RFID device 200 of FIG. 2). In other examples, such as when the signal wires 218 is an analog 4-20 mA current loop (e.g., loop power) to implement the HART protocol, the RFID device 300 is connected to the signal wires 218 in series with the field device 122.

In the illustrated example of FIG. 3, the RFID tag 306 operates in a semi-passive mode such that the RFID processor 308 and the RFID onboard memory 310 are powered independently of the RFID reader/writer 206. In particular, in some examples, the RFID processor 308 and the RFID onboard memory 310 are powered via the field device 122 (e.g., via the control system power provided to the field device 122). As represented by the solid lines 314 in the illustrated example of FIG. 3, the communications associated with the field device 122, the power manager 302, the capacitor 304, the RFID processor 308, and the RFID onboard memory 310 rely on control system power. Thus, unlike the communications associated with the RFID processor 212 and the RFID onboard memory 214 of the RFID tag 210 of FIG. 2 (represented by the dotted lines 228) that are powered by the RFID reader/writer 206, the RFID processor 308 and the RFID onboard memory 310 of FIG. 3 are control system powered. However, the communications of the RFID antennas 216, 312 in both FIGS. 2 and 3 are powered by the RFID reader/writer 206 (as represented by the corresponding dotted lines 228, 316).

As described above, the RFID onboard memory 214 of the RFID tag 210 of FIG. 2 is relatively limited because the memory relies on the RFID reader/writer 206. In contrast, the RFID onboard memory 310 of the RFID tag 306 in the illustrated example of FIG. 3 is not so limited by power constraints because the RFID onboard memory 310 (along with the RFID processor 308) relies on control system power from the DCS 201. Accordingly, in some examples, the RFID onboard memory 310 may store up to any suitable amount of data (e.g., megabytes or even gigabytes of data). In this manner, more information can be stored onboard the RFID tag 306 such that a separate nonvolatile memory (such as the non-volatile memory 208 of the RFID device 200 of FIG. 2) may be unnecessary to store the data received from and/or associated with the field device 122. However, in some examples, the RFID onboard memory 310 may nevertheless be somewhat limited to enable access to information stored thereon if power is lost or otherwise becomes unavailable by powering the memory via the RFID reader/writer 206 (e.g., operating in a passive mode) at a short range (e.g., within one foot). In some such examples, the memory size of the RFID onboard memory 310 may be up to 1 gigabyte. Further, in some examples, due to the typically powered nature of the RFID onboard memory 310, the memory may be implemented using higher capacity memory, such as for example, magnetoresistive random access memory (MRAM), which has several features that may be desirable in a control system environment. For example, although MRAM uses more power, MRAM may be desirable in that it is radiation resistant, has a high number of writes, has relatively long memory storage without a refresh, and has relatively long memory storage at elevated temperatures.

With the RFID processor 308 and the RFID onboard memory 310 powered via the field device 122 as described above, the RFID antenna 312 can be improved (e.g., optimized) for communications because all the power received via the EMF of the RFID reader/writer 206 may be devoted to the communications. In particular, the RFID antenna 312 can be structured more for omni-directional communications (rather than directional for purposes of power conversion) that can read longer ranges than possible using a passive RFID tag (e.g., as shown in the illustrated example of FIG. 2). Although the RFID tag 306 of FIG. 3 is configured to function in a semi-passive mode with the RFID processor 308 and RFID onboard memory 310 powered via the signal wires 218, in some examples, the RFID tag 306 may still function in a passive mode when no power is provided (e.g., when there is a shut down, the field device is taken out of service, when the field device is first uncrated, etc.) by receiving power from the RFID reader/writer 206 via the RFID antenna 312. Thus, the RFID tag 310 is capable of communicating over a long range when the field device 122 is powered (thereby providing power to the RFID device 300) but also communicating over a short range when the field device 122 is not powered as illustrated by the two RFID reader/writers 206 illustrated in FIG. 3.

As the RFID onboard memory 310 of FIG. 3 uses more power than the RFID onboard memory 214 of FIG. 2, the maximum read range for the RFID device 300 of FIG. 3 when operating without power (e.g., in a passive mode) is less than the read range for the RFID device 200 of FIG. 2. For example, as described above, the RFID device 200 of FIG. 2 has a read range of up to about 30 feet regardless of whether the field device is powered. In contrast, while the RFID device 300 of FIG. 3 has a read range of up to about 90 feet when powered by the field device 122, if there is no power, the resulting read range may be limited to within a foot of the RFID antenna 312 because the tag 306 includes a higher capacity memory that uses more power than the RFID onboard memory 214 described in connection with FIG. 2 above. Thus, the example RFID devices 200, 300 shown and described in connection with FIGS. 2 and 3 are representative of different trade-offs made with respect to wireless communications. The example RFID device 200 of FIG. 2 is capable of maintaining relatively long read ranges (e.g., up to 30 feet) even when there is no power available, but the tradeoff for maintaining this communication range is that the RFID onboard memory 214 is relatively limited in storage capacity. However, as described above, the limited onboard memory of the example RFID device 200 of FIG. 2 is somewhat mitigated by the separate non-volatile memory 208 that may be available when power is available. On the other hand, the RFID device 300 of FIG. 3 is capable of significantly longer read ranges (e.g., up to 90 feet) along with an increased onboard memory capacity, but the tradeoff is that the extended read range is dependent upon control system power being provided to the RFID device 300. Further, if no control system power is available, the increased memory capacity of the example RFID device 300 of FIG. 3 is still available but is limited to circumstances when the RFID reader/writer 206 is within approximately one foot of the device.

Aside from the differences in powering of the RFID tag 210 of FIG. 2 and the RFID tag 306 of FIG. 3 and the resulting differences in read ranges and memory capacities, the RFID devices 200, 300 shown in each of FIGS. 2 and 3 differ in other ways as well. In particular, unlike the example RFID device 200 of FIG. 2, the example RFID device 300 of FIG. 3 does not include the HART modem 202. Instead of having a HART modem 202 as in the RFID device 200 of FIG. 2 to communicate HART data (or other data if the modem corresponds to a different protocol), the RFID device 300 of FIG. 3 may store any type of data received from and/or pertaining to any type of field device 122. As such, the RFID device 300 of FIG. 3 has the advantage of being substantially universal in its application. Thus, as shown in FIG. 3, the field device 122 is not designated as a HART field device (or other specific protocol) as shown in FIG. 2. While the RFID device 300 has the advantage of receiving data from and/or pertaining to any type of field device, the RFID device 200 of FIG. 2 has the advantage of being able to provide protocol specific communications of data back to the field device 122 and/or the DCS 201, thereby enabling, for example, communications with the DCS 201 and/or the commissioning and/or configuration of a field device when put into service (e.g., after being repaired).

Further, in the illustrated example of FIG. 3, the RFID device 300 is provided with the power manager 302 that serves as a power supply to scavenge power from the field device (e.g., control system power provided by the DCS 201) and provide power to the RFID tag 306 (e.g., for semi-passive operation). In some examples, the power manager 302 may be associated with the capacitor 304 to store energy harvested from the control system power. In such examples, power may be available to the RFID tag 306 if the control system power is intermittently unavailable (e.g., when the power requirements of the field device 122 are using all the control system power). In some examples, the capacitor 304 is a supercapacitor. As the power manager 302 draws power from the field device 122 to charge the capacitor 304, the power manager 302 may absorb control signals communicated along the signal wires 218. Accordingly, in some examples, the power manger 302 includes a signal conditioner to enable power to be tapped off of the control system without disrupting signals communicated over the control system.

While example manners of implementing the RFID device 124 of FIG. 1 are illustrated in FIGS. 2 and 3, one or more of the elements, processes and/or devices illustrated in FIGS. 2 and/or 3 may be combined, divided, re-arranged, omitted, eliminated and/or implemented in any other way. For example, the RFID device 200 of FIG. 2 may be implemented using the RFID tag 306 described in FIG. 3 and/or the RFID device 300 of FIG. 3 may be implemented using the RFID tag 210 of FIG. 2 based on any suitable power arrangement. That is, in some examples, either of the RFID tags 210, 306 may be configured to operate in a fully-passive mode. In some examples, either of the RFID tags may be configured such that the corresponding RFID processor 212, 308 and RFID onboard memory 214, 310 of FIG. 2 may be control system powered while the RFID antenna 216, 312 is powered via the RFID reader/writer 206. In other examples, the RFID antenna 216, 312 may be control system powered while the RFID processor 212, 308 and the RFID onboard memory 214, 310 rely on power from the RFID reader/writer 206. Likewise, in some examples, each of the RFID devices 200, 300 are provided with a battery power or capacitor. Additionally, either of the RFID device tags 210, 306 may be adapted to be implemented in a fully active mode for longer communication ranges that may be broadcast by the corresponding antenna 216, 312. Furthermore, in some examples, the RFID device 300 of FIG. 3 may include a separate non-volatile memory similar to that described in FIG. 2 to supplement the RFID onboard memory 310. Further, the example HART modem 202, the example microcontroller 204, the example RAM 207, the example non-volatile memory 208, and the example main RFID processor 212, the example RFID onboard memory 214, and the example RFID antenna 216 of the example RFID tag 210, the example power manager 302, the example capacitor 304, and the example RFID processor 308, the example RFID onboard memory 310, and/or the example RFID antenna 312 of the example RFID tag 306, and/or, more generally, the example RFID devices 200, 300 of FIGS. 2 and/or 3 may be implemented by hardware, software, firmware and/or any combination of hardware, software and/or firmware. Thus, for example, any of the example HART modem 202, the example microcontroller 204, the example RAM 207, the example non-volatile memory 208, the example main RFID processor 212, the example RFID onboard memory 214, and the example RFID antenna 216 of the example RFID tag 210, the example power manager 302, the example capacitor 304, and the example RFID processor 308, the example RFID onboard memory 310, and/or the example RFID antenna 312 of the example RFID tag 306, and/or, more generally, the example RFID devices 200, 300 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, example HART modem 202, the example microcontroller 204, the example RAM 207, the example non-volatile memory 208, and/or the example main RFID processor 212, the example RFID onboard memory 214, and/or the example RFID antenna 216 of the example RFID tag 210, the example power manager 302, the example capacitor 304, and the example RFID processor 308, the example RFID onboard memory 310, and/or the example RFID antenna 312 of the example RFID tag 306 is/are hereby expressly defined to include a tangible computer readable storage device or storage disk such as a memory, a digital versatile disk (DVD), a compact disk (CD), a Blu-ray disk, etc. storing the software and/or firmware. Further still, the example RFID devices 200, 300 of FIGS. 1, 2, and/or 3 may include one or more elements, processes and/or devices in addition to, or instead of, those illustrated in FIGS. 1, 2, and/or 3 and/or may include more than one of any or all of the illustrated elements, processes and devices.

Figure 4:
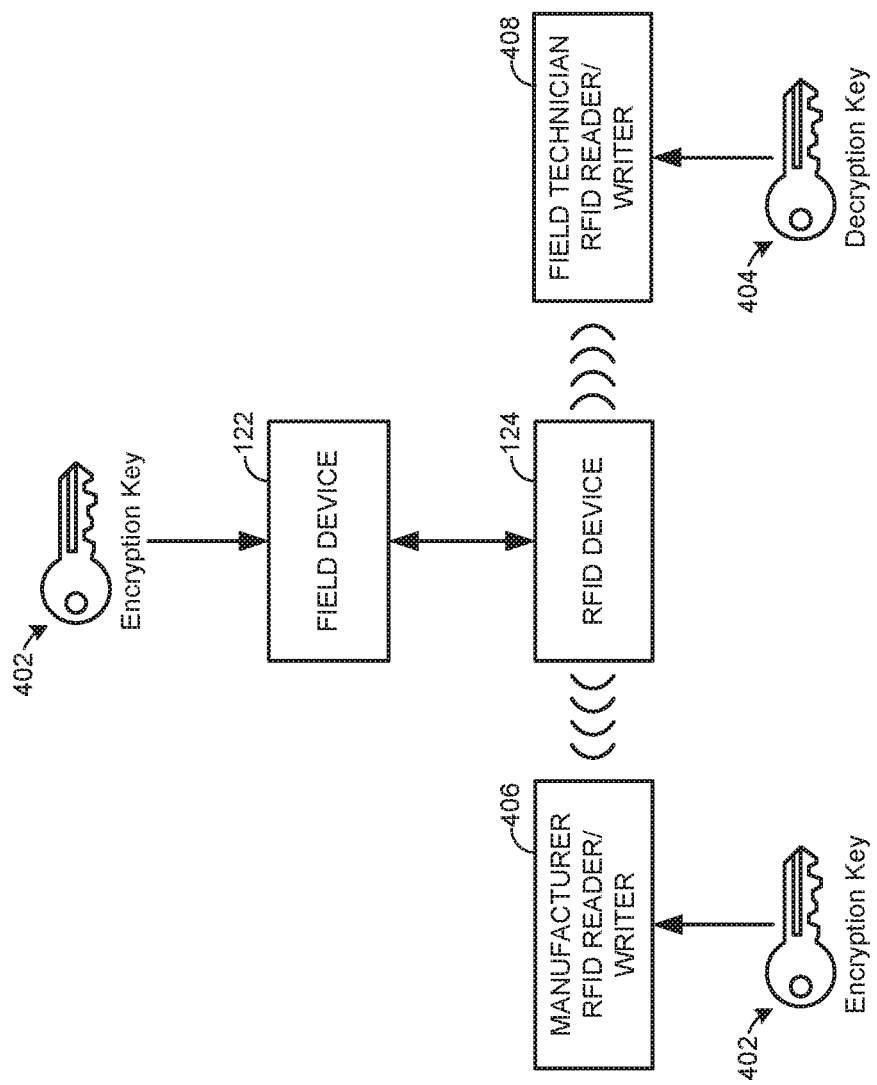
FIG. 4 illustrates an example manner of implementing encrypted data records in the example RFID device of FIGS. 2 and/or 3.

Another aspect of the teachings disclosed herein is the use of asymmetric cryptography to protect any or all of the data or records stored on the RFID devices 124, 200, 300. As depicted in FIG. 4, asymmetric cryptography or encryption refers to a cryptographic system utilizing two separate cryptographic keys that asymmetrically control or protect the storage, access, and/or retrieval of data and/or records in the RFID devices 124, 200, 300 associated with a field device 122. For instance, in some examples, an encryption key 402 serves to lock (e.g., encrypt) data written to the RFID device memory. In some such examples, a separate decryption key 404 serves to unlock or read (e.g., decrypt) the data records. Further, in some examples, neither the encryption key 402 nor the decryption key 404 can perform both the encryption and decryption functions by itself. That is, the encryption key 402 cannot be used to access (e.g., read) the data and the decryption key 404 cannot be used to alter, remove, or overwrite the data.

Using asymmetric cryptography in this manner, manufacturers can provide manufacturer certified information associated with the field device 122 (e.g., serial card data, certified part information, etc.) without compromising the security of such certification, for example, from third party entities repairing and/or replacing components of the field device 122 with non-certified replicated parts and/or corresponding non-certified information. To do so, in some examples, the manufacturer uses the encryption key 402 to initially encrypt information at the time of manufacture. In some examples, encryption is accomplished via an RFID reader/writer maintained by the manufacturer that includes the encryption key 402 (e.g., the manufacturer RFID reader/writer 406). In some examples, decryption is accomplished via a separate RFID reader/writer maintained by a technician or other end user that includes the decryption key 404 (e.g., the field technician RFID reader/writer 408). Additionally or alternatively, in some examples, a manufacturer may provide the encryption key 402 directly with a newly manufactured field device 122 to encrypt the relevant information. Further, in some such examples, the encryption key 402 associated directly with the field device 122 enables data generated by the field device 122 during operation to also be secured through encryption. In this manner, manufacturers can provide relevant data to be stored in the non-volatile memory 208 of the RFID device 200 (or in the onboard memory 310 of the RFID device 300) that is protected (e.g., encrypted) to reduce the potential for such information being altered, removed, corrupted, or confused with any non-secured (e.g., unencrypted) information.

As a specific example, serial card data or certified part information may be encrypted and stored with the non-volatile memory of the RFID device 200 of FIG. 2 by a field device manufacturer (e.g., via a manufacturer RFID reader/writer 406 or based on the encryption key 402 within the field device 122 itself) to create secure, certified data specific to the field device 122 accessible throughout the lifecycle of the device without concern for the data being changed or mistaken for other information to ensure tracking and maintenance information is protected. Additionally or alternatively, in some examples the field device 122 may encrypt (e.g., via the encryption key 402) operational data (e.g. failure events or alerts) to provide secure operational records for later diagnostic analysis. In some such examples, the decryption key 404 may be provided or published to enable maintenance technicians or other users to readily access parts information or maintenance data (e.g. photographs, instruction manuals) via a field technician RFID reader/writer 408 (e.g., associated with the decryption key 404) but not enable the technicians or other third party entities to alter or remove (inadvertently or otherwise) the secured information. In this manner, technicians have ready access to helpful information with less concern for errant data records and/or out of date information related to the field device 122 and without compromising security of the records created by the manufacturer.

As shown in the illustrated example, the difference between the manufacturer RFID reader/writer 406 and the field technician RFID reader/writer 408 is the cryptographic key 402, 404 with which each RFID reader/writer 406, 408 is associated. That is, each of the RFID reader/writer 406, 408 may be a same or similar RFID reader/writer, each of which is supplied with either the encryption key 402 or the decryption key 404. In some examples, the encryption key 402 or the decryption key 404 is downloaded to the corresponding RFID reader/writer 406, 408 via a USB dongle or USB connection with a computer that has the corresponding cryptographic key 402, 404. In some examples, the encryption key 402 or the decryption key 404 is provided to the corresponding RFID reader/writer 406, 408 manually by entering the relevant information via a user interface (e.g., keypad) on the RFID reader/writer 406, 408.

Additionally or alternatively, in some examples, the encryption key 402 or the decryption key 404 is provided to the corresponding RFID reader/writer 406, 408 via a manufacturer provided key fob, authentication card, or security token. In some such examples, the key fob functions in connection with the corresponding RFID reader/writer 406, 408 based on far field communications. That is, when a key fob associated with the encryption key 402 is within range for far field communications (e.g., less than one foot), the capability of the manufacturer RFID reader/writer 406 to encrypt data is activated whereas when the key fob is out of range, the encryption functionality is unavailable. Similarly, when a key fob associated with the decryption key 404 is within range, the decryption functionality is available to the field technician RFID reader/writer 408 but becomes unavailable once the key fob is taken out of range. In some situations, the field device 122 may not be directly associated with the encryption key 402 and the manufacturer RFID reader/writer 406 may not be available for encryption when the manufacturer desires (e.g., when a manufacturer representative or other authorized personnel is visiting a client with previously purchased field devices). Accordingly, in some examples, the manufacturer authorized personnel is provided with the key fob associated with the encryption key 402 that, once authenticated, would enable the user to add desired encrypted information (e.g., an updated certified parts list) without a designated encryption RFID reader/writer (e.g., the manufacturer RFID reader/writer 406 maintained at the manufacturing site of the field device 122). In some such examples, the key fob may be used in conjunction with the field technician reader/writer 408 to encrypt the desired information. Further, in some examples, the key fob and/or the RFID reader/writer 408 can communicate with multiple RFID devices 124, 200, 300 at one time (that are within the RFID signal range) to update each corresponding field device as appropriate.

Figure 5:
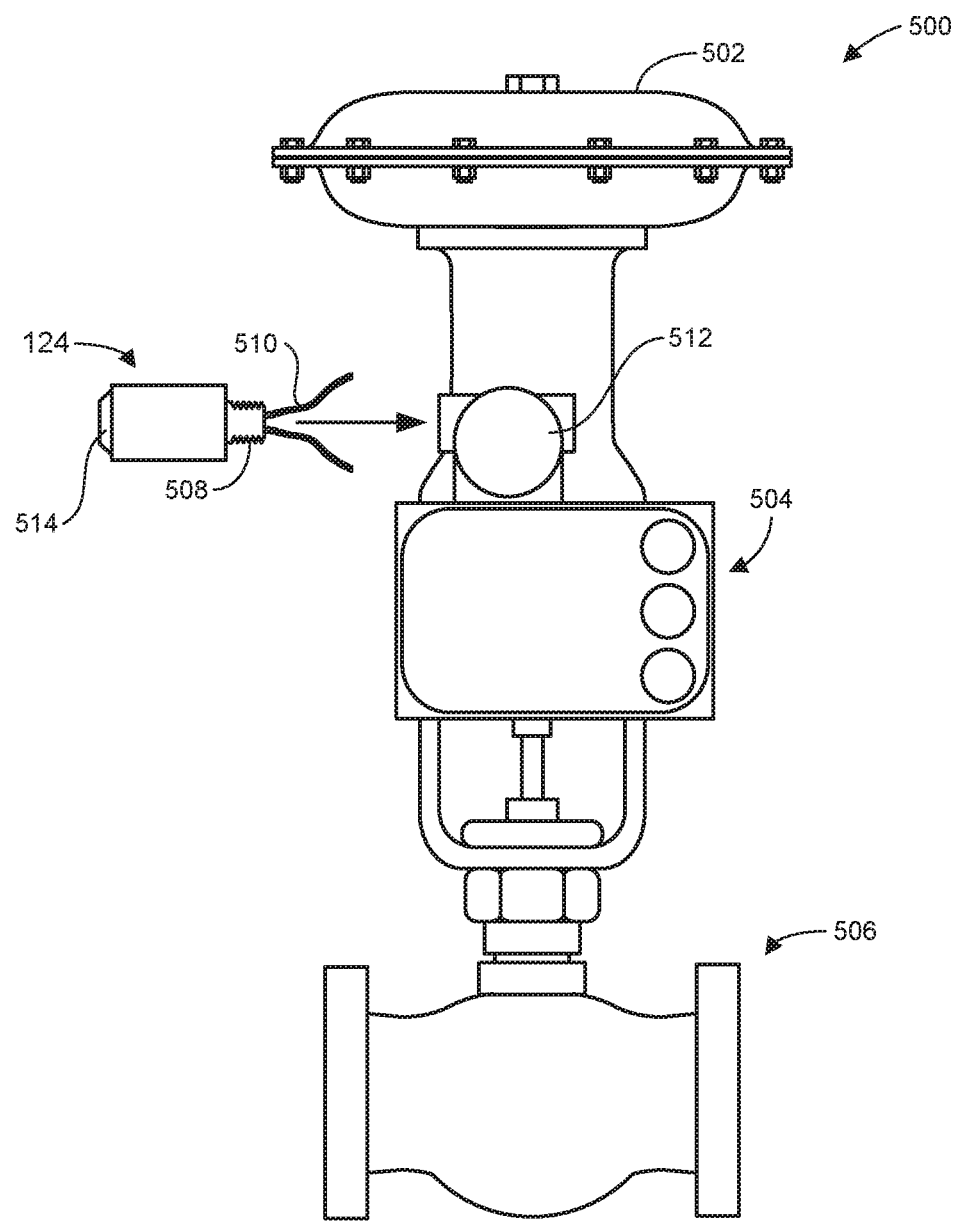
FIG. 5 illustrates a particular implementation of the example RFID devices of FIGS. 2 and/or 3 to be coupled to an actuator via a valve controller to control a valve.

FIG. 5 illustrates a particular implementation of the example RFID devices of FIGS. 1, 2, and/or 3 to be physically and operatively coupled to an example field device 500 comprising an actuator 502 and a valve controller 504 coupled to a valve 506. More particularly, in some examples, as shown in FIG. 5, the RFID device 124 (e.g., the RFID devices 200, 300 of FIGS. 2 and/or 3) is physically coupled to the field device 500 by fastening threads 508 of the RFID device 124 to the valve controller 504. In some examples, the threads 508 conform to standard piping threads. Additionally, in some examples, the RFID device 124 is operatively coupled to the field device 500 by connecting wires 510 of the RFID device 124 to the valve controller 504 within a terminal box 512 of the valve controller 504. In this manner, the RFID device 124 has access to the control system power provided from a control room to the field device from which the RFID device 124 can power its internal components as described above. Many existing field devices have auxiliary input terminals within the terminal box to which the wires 510 may be connected such that the RFID device 124 can be retrofitted to many existing field devices. In other examples, the RFID device 124 is incorporated directly into a field device rather than being a separate device that is coupled thereto.

In some examples, the RFID antenna 216, 312 of the corresponding RFID device 200, 300 shown in FIGS. 2 and 3 is located at an end 514 of the RFID device 124 opposite the threads 508. In some examples, the threads 508 can be used in conjunction with standard pipe fittings (e.g., an elbow) to orient the RFID antenna 216, 312 in any desired direction independent of the valve controller 504. In other examples, the RFID antenna 216, 312 may be omni-directional such that orientation of the RFID device is less significant.

As shown in the illustrated example of FIG. 5, by physically connecting and operatively wiring the RFID device 124 to the field device 500, a hazardous area rating can be achieved that enables wireless communications to a nearby RFID reader/writer (e.g., the RFID reader/writer 206). Furthermore, the physical attachment of the RFID device 124 to the field device 500 enables the RFID tag 210, 306 to be permanently associated with the field device 500 (i.e., for as long as the RFID device remains fastened to the field device 500) even when the field device 500 is taken out of service, removed to a new location, and/or isolated from the rest of the process control system (e.g., for maintenance and/or repair).

Flowcharts representative of example methods for implementing the RFID devices 124, 200, 300 of FIGS. 1, 2, and/or 3 are shown in FIGS. 6-10. In some examples, the methods may be implemented as a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 6-10, many other methods of implementing the example RFID devices 124, 200, 300 may alternatively be used. For example, the order of execution of the blocks may be changed, and/or some of the blocks described may be changed, eliminated, or combined.

As mentioned above, the example methods of FIGS. 6-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 6-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals and to exclude transmission media. As used herein, when the phrase "at least" is used as the transition term in a preamble of a claim, it is open-ended in the same manner as the term "comprising" is open ended.

Figure 6:
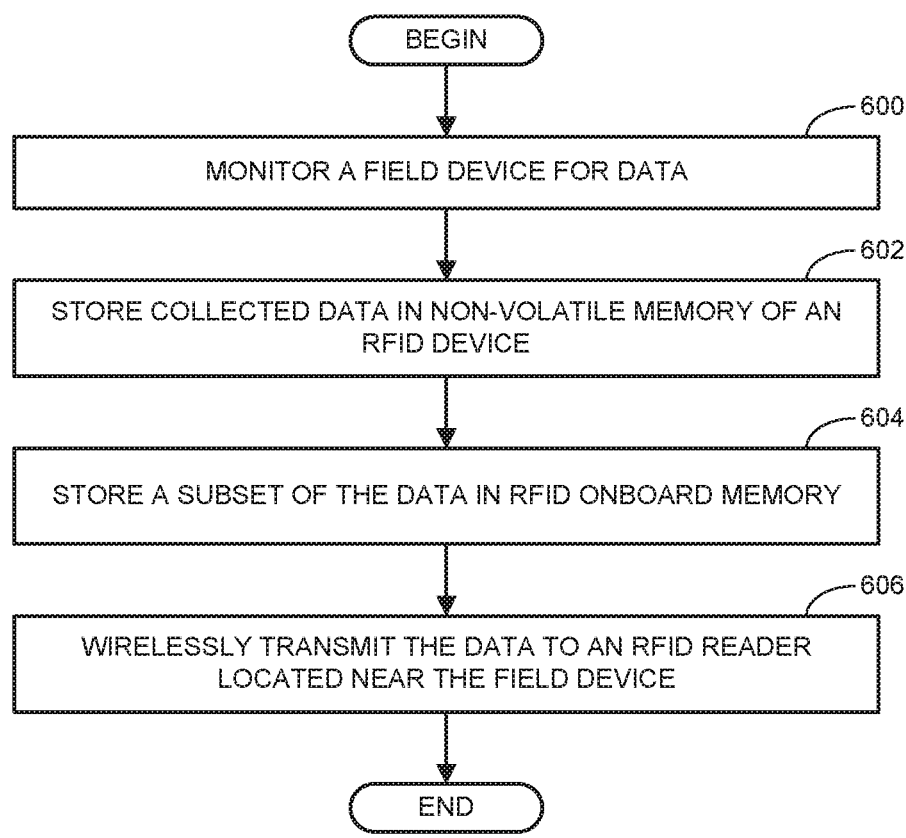
FIG. 6 is a flowchart representative of an example method for implementing the example RFID device of FIG. 2 to wirelessly communicate data from a field device to a local RFID reader/writer.

FIG. 6 is a flowchart representative of an example method for implementing the example RFID devices 124, 200 of FIGS. 1, and/or 2 to wirelessly communicate data from a field device to a local RFID reader/writer. In particular, the example method of FIG. 6 begins at block 600 with the microcontroller 204 monitoring communications associated with a field device (e.g., the field device 122). In some examples, the microcontroller 204 monitors communications by requesting and/or to interrogating the field device 122 for data via the example modem 202. In other examples, the microcontroller 204 passively receives data (e.g., device alerts) from the field device 122 whenever they are transmitted (e.g., when in burst mode). Additionally or alternatively, in some examples, the microcontroller 204 may passively receive plant alerts or other data sent to the field device 122 from the DCS 201. Thus, in some examples, the microcontroller 204 is configured to monitor all bus traffic on the signal wires 218 to be collected and stored. Furthermore, because the monitoring is accomplished through the HART modem 202, there is no need to be directly linked to the processor of the field device. As a result, the RFID device 124 can be coupled to any type of field device (e.g., positioner, transmitter, etc.) without the need for any special configurations for the particular device.

At block 602 of the example method, the non-volatile memory 208 of the RFID device 200 stores the collected data. One advantage of storing the data in the non-volatile memory 208 is that, once stored, the data is accessible at much faster communication speeds because the transmissions of the data are no longer limited by the relatively slow HART communication protocol (e.g., through the modem 202). This is especially a concern when plant personnel located in the field near a field device desire a large amount of data. For example, plant personnel may desire to access the historical maintenance records over the life of a particular field device to trend the error signals of the device over time. Typically, a technician in the field local to the field device would physically clip on to the device (e.g., opening the terminal cap) and request such information from a remote central control facility where the maintenance records were stored because the amount of data (e.g., all error signals and/or alerts generated over the life of the field device) would exceed the limited memory capacities of the field device. Furthermore, retrieving the data from a remote facility would typically be accomplished over the relatively slow communication protocol for the control system. As a result, the retrieval of such data can be inefficient and impractical. However, if the data is stored or buffered in advance (e.g., over time) in the non-volatile memory 208 as disclosed herein, the subsequent retrieval of such information can be performed relatively quickly based on the high speed communications possible between the non-volatile memory 208 and the RFID reader/writer 206. Furthermore, the non-volatile memory can be of any suitable size to store and/or archive any desired information (including information not typically stored locally at the field device such as the maintenance records described above). Another advantage of storing the data on the non-volatile memory 208 for retrieval via the RFID reader/writer 206 is that such retrieval is wireless and, therefore, does not require removing the terminal cap of the field device 122. In some examples, the field device is associated with an encryption key (e.g., the encryption key 402 of FIG. 4) such that the data stored in the non-volatile memory is secured and accessible only with a corresponding decryption key (e.g., the decryption key 404 of FIG. 4).

At block 604, the example RFID onboard memory 214 stores a subset of the data. Although the non-volatile memory 208 can be of any suitable size, the amount of memory available within the RFID tag 210 is relatively limited such that only some of the data retrieved from the field device 122 may be stored within the RFID onboard memory 214. Accordingly, in some examples, the subset of the data includes information associated with the identification, maintenance, and/or commissioning of the field device 122 as described above.

At block 606, the example RFID processor 212 wirelessly transmits the data to an RFID reader/writer (e.g., the example RFID reader/writer 206) located near (e.g., within transmission range) the field device 122. In some examples, the transmitted data corresponds to the subset of the data stored on the RFID onboard memory 214. Additionally or alternatively, in some examples, the transmitted data corresponds to the data stored in the non-volatile memory 208. In some examples, where the data was encrypted, the RFID reader/writer is associated with the decryption key to enable access of the data. In the illustrated example, block 600 involves loop power because the RFID device 200 is connected into the loop associated with the field device 122 and the field device 122 can only provide data when it is receiving such power. Additionally, blocks 602 and 604 involve a power source (e.g., control system power and/or battery power) to enable the microcontroller 204 to write the collected data to the non-volatile memory 208 (block 602) and to provide the subset of the data to the RFID processor 212 to be written to the RFID onboard memory 214 (block 604). However, block 606 of the example program may be implemented with or without control system power (or battery power or other power source (e.g., solar power)) because the RFID tag 210 is powered by the electromagnetic force generated by the nearby RFID reader/writer.

Figure 7:
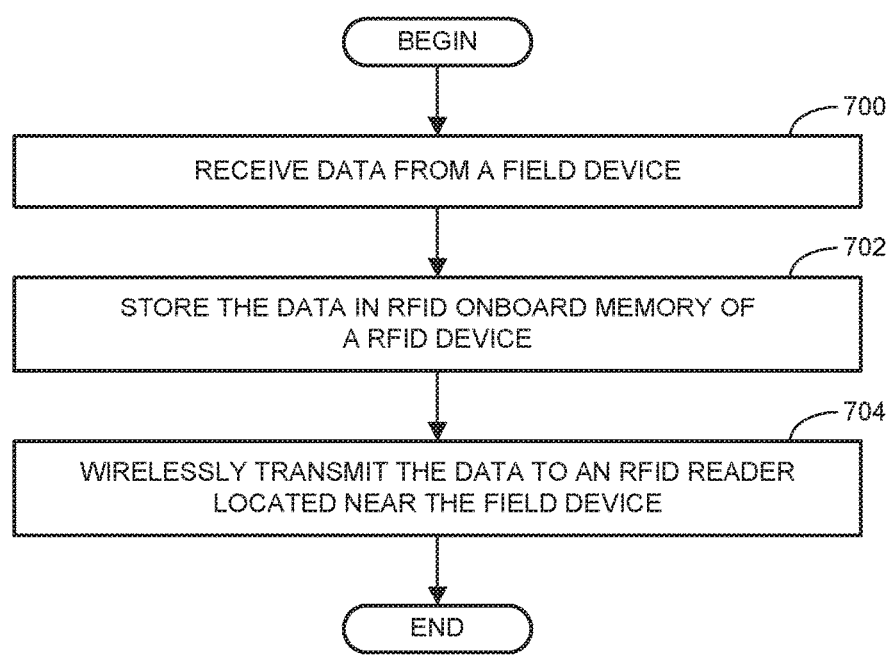
FIG. 7 is a flowchart representative of an example method for implementing the example RFID device of FIG. 3 to wirelessly communicate data from a field device to a local RFID reader/writer.

FIG. 7 is a flowchart representative of an example method similar to the example method of FIG. 6 for implementing the example RFID devices 124, 300 of FIGS. 1 and/or 3 to wirelessly communicate data from a field device to a local RFID reader/writer. In particular, the example method of FIG. 7 begins at block 700 with the RFID processor 308 receiving data from a field device (e.g., the field device 122). At block 702 of the example method, the RFID onboard memory 310 of the RFID device 300 stores the data. As described above, the RFID onboard memory 310 of the example RFID device 300 of FIG. 3 may have significantly higher storage capacity than the onboard memory of the RFID device 200 of FIG. 2 because the RFID onboard memory 310 is powered by the field device (e.g., via control system power). Accordingly, in some examples, the data received from the field device is stored directly on to the RFID tag 306 rather than in a separate non-volatile memory as described above in connection with FIG. 2. In this manner, any data associated with the field device may be immediately available to an RFID reader that is near the field device (e.g., within the communication range of the RFID tag 306). In some examples, the field device is associated with an encryption key (e.g., the encryption key 402 of FIG. 4) such that the data stored in the RFID onboard memory 310 is secured and accessible only with a corresponding decryption key (e.g., the decryption key 404 of FIG. 4).

At block 704, the example RFID processor 308 wirelessly transmits the data to an RFID reader/writer (e.g., the example RFID reader/writer 206) located near (e.g., within transmission range) the field device 122. In some examples, the transmission range associated with the RFID device 300 of FIG. 3 is significantly greater than the range associated with the RFID device 200 of FIG. 2 because the RFID processor 308 and RFID onboard memory 310 use control system power to allow the RFID antenna 312 to be focused on communications. Not only do such examples enable longer communication ranges, the RFID antenna 312 may be omni-directional. In some examples, where the data was encrypted, the RFID reader/writer is associated with the decryption key to enable access of the data.

Figure 8:
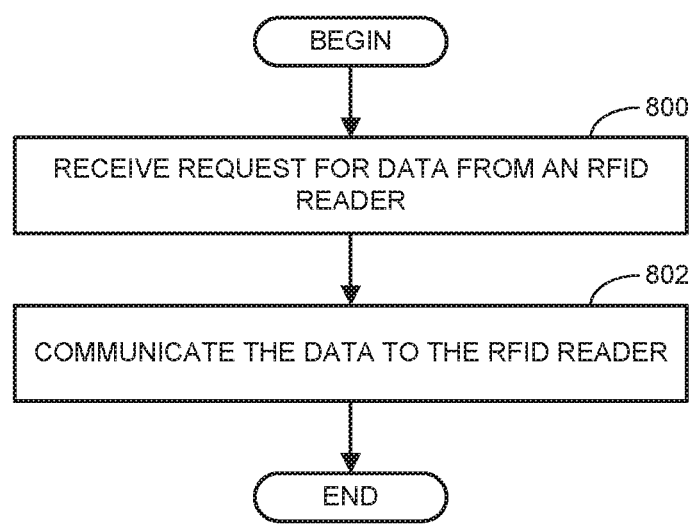
FIG. 8 is a flowchart representative of an example method for implementing the example RFID devices of FIGS. 1, 2, and/or 3 to provide data from a field device requested locally via an RFID reader/writer.

FIG. 8 is a flowchart representative of an example method for implementing the example RFID devices 124, 200, 300 of FIGS. 1, 2, and/or 3 to provide data requested locally via an RFID reader/writer. In particular, the example method of FIG. 8 begins at block 800 with the example RFID processor 212 receiving a request for data from an RFID reader/writer (e.g., the example RFID reader/writer 206 via the example RFID antenna 216, 312). At block 802, the example RFID processor 212, 308 communicates the data to the example RFID reader/writer 206 via the example RFID antenna 216, 312. In some examples, the data corresponds to data cached in the onboard memory 214 of the example RFID device 200 of FIG. 2 previously provided from the non-volatile memory 208 associated with the microcontroller 204. In some examples, where the RFID device 300 of FIG. 3 is used, the data is stored directly on the RFID onboard memory 310 and communicated from there independent of a separate non-volatile memory. In some examples, the data corresponds to data stored in the non-volatile memory 208 of the example RFID device 200. In some examples, the communication of the data is based on a fully passive implementation of RFID technology and, therefore, does not need control system power because the RFID tag is powered via an EMF of the RFID reader/writer. In other examples, the RFID device (e.g., as described in FIG. 3) is control system powered. Once the example RFID processor 212, 308 communicates the data to the example RFID reader/writer 206 the example RFID tag 210, 306 is ready to process another request from the RFID reader/writer 206 and the example method of FIG. 8 ends.

Figure 9:
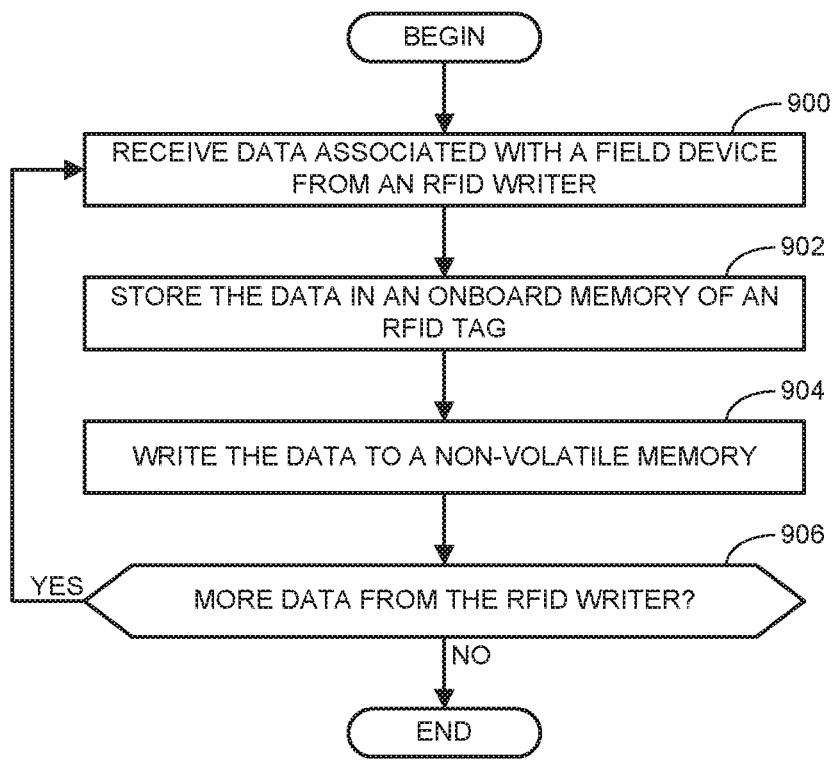
FIG. 9 is a flowchart representative of an example method for implementing the example RFID devices of FIGS. 1, 2, and/or 3 to provide data to the RFID device associated with a field device generated locally via an RFID reader/writer.

FIG. 9 is a flowchart representative of an example method for implementing the example RFID devices 124, 200, 300 of FIGS. 1, 2, and/or 3 to provide data to the RFID devices 124, 200, 300 associated with a field device generated locally via an RFID reader/writer. In particular, the example method of FIG. 9 begins at block 900 where the example RFID tag 210 (via the RFID antenna 216) or the example RFID tag 306 (via the RFID antenna 312) receives data associated with a field device (e.g., the field device 122) from an RFID reader/writer (e.g., the example RFID reader/writer 206). In some examples, the data corresponds to information relating to the identification and/or maintenance of the field device such as, for example, serial card information, an asset tag, a specification sheet, an instruction manual, a parts lists and/or associated part numbers, photos/images of the field device 122, etc. In some examples, the data corresponds to new and/or additional maintenance information corresponding to the field device 122 that was previously unavailable (e.g., an updated recommended parts list). In some examples, the RFID reader/writer 206 is associated with an encryption key (e.g., the encryption key 402 of FIG. 4) such that the data is secured and subsequently accessible only with a corresponding decryption key (e.g., the decryption key 404 of FIG. 4). At block 902 the example RFID processor 212, 308 stores the data in the onboard memory 214, 310 of the RFID tag 210, 306. In some examples, as with the RFID device 200 of FIG. 2, the communication of the data from the RFID reader/writer 206 to the onboard memory 214 of the RFID tag 210 is accomplished without control system power provided to the field device and/or the RFID device 200. In other examples, as with the RFID device 300 of FIG. 3, the onboard memory 310 and the processor 308 are control system powered. At block 904, the example microcontroller 204 of the example RFID device 200 writes the data to the example non-volatile memory 208. In some examples, where the data is updated information, the microcontroller 204 overwrites previously stored information. With respect to the RFID device 200 of FIG. 2, block 902 may be omitted as data is passed through the RFID tag 210 and written directly to the non-volatile memory 208 without storing the data in the onboard memory 214. With respect to the RFID device 300 of FIG. 3, block 904 may be omitted as data is directly written to the RFID onboard memory 310. At block 906 the example RFID tag 210, 306 determines whether there is more data to be received from the RFID reader/writer. If the example RFID tag 210, 306 determines there is more data, control returns to block 900. If the example RFID tag 210, 306 determines there is not more data to be received, the example method of FIG. 9 ends.

Figure 10:
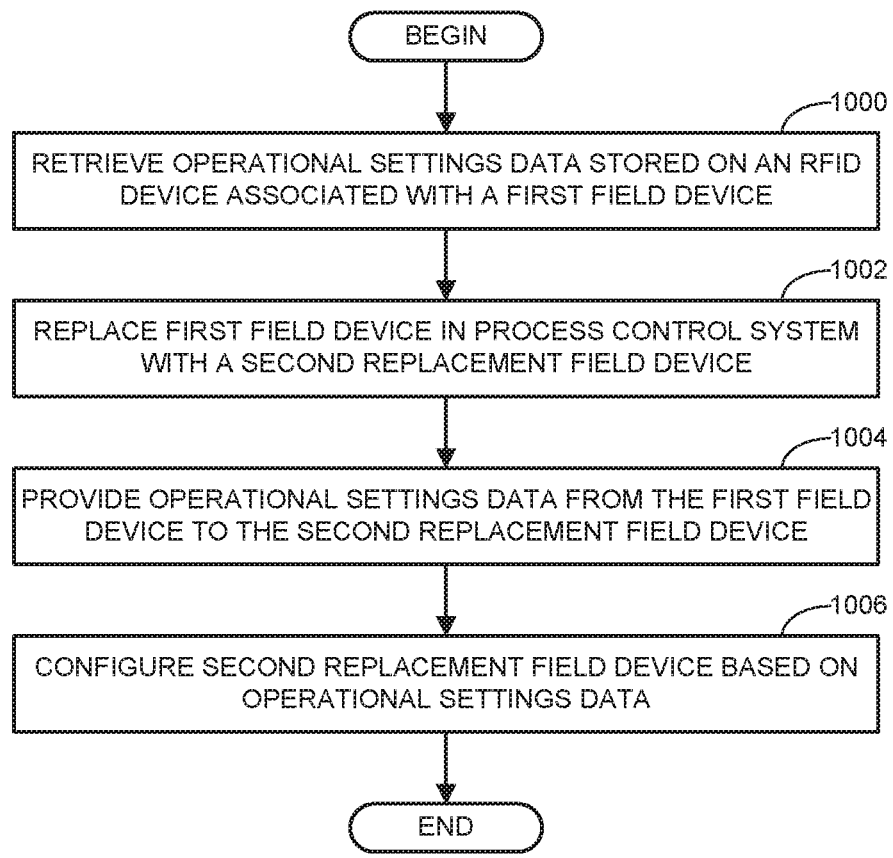
FIG. 10 is a flowchart representative of an example method of replacing a first field device in the example process control system 100 with a second replacement field device using the example RFID devices of FIGS. 1, 2, and/or 3 to automatically configure the second replacement field device.

FIG. 10 is a flowchart representative of an example method of replacing a first field device (e.g., the field device 122 of FIG. 1) in a process control system (e.g., the example process control system 100 of FIG. 1) with a second replacement field device using the example RFID devices 124, 200 of FIGS. 1, and/or 2 to automatically configure the second replacement field device. The example method begins at block 1000 by retrieving operational settings data stored on an RFID device (e.g., the RFID device 200 of FIG. 2) associated with the first field device (i.e., the field device 122 to be removed). In some examples, the operational settings data corresponds to parameters and/or other inputs used in the commissioning and/or configuration of the field device 122. In some examples, the operational settings data is retrieved by requesting the data from the RFID device 200 via an RFID reader/writer (e.g., the RFID reader/writer 206) as described above. In other examples, the operational settings data is retrieved by removing (e.g., disconnecting) the RFID device 200 from the field device 122.

At block 1002 of the example method of FIG. 10 the first field device (e.g., the field device 122) in the process control system 100 is replaced with a second replacement field device. At block 1004 the operational settings data from the first field device is provided to the second replacement field device. In some examples, where the operational settings data was retrieved via an RFID reader/writer 206 (block 1000), the operational settings data is wirelessly transmitted to a second RFID device 200 coupled to the second replacement field device. In other examples, where the RFID device 200 of the first field device 122 is removed to retrieve the operational settings data (block 1000), the operational settings data is provided by connecting the RFID device 200 to the second replacement field device. In either example, the second replacement field device has direct access to the operational settings data. Accordingly, at block 1006, the second replacement field device is configured based on the operational settings data. Because the operational settings data originally stored in connection with the first field device 122 is transferred to the second replacement device, the configuration and commissioning of the second replacement device can be accomplished substantially automatically without the need for plant personnel to enter individual parameter values as would be otherwise required. Once the second replacement field device is configured (block 1006), the example method of FIG. 10 ends.

Figure 11:
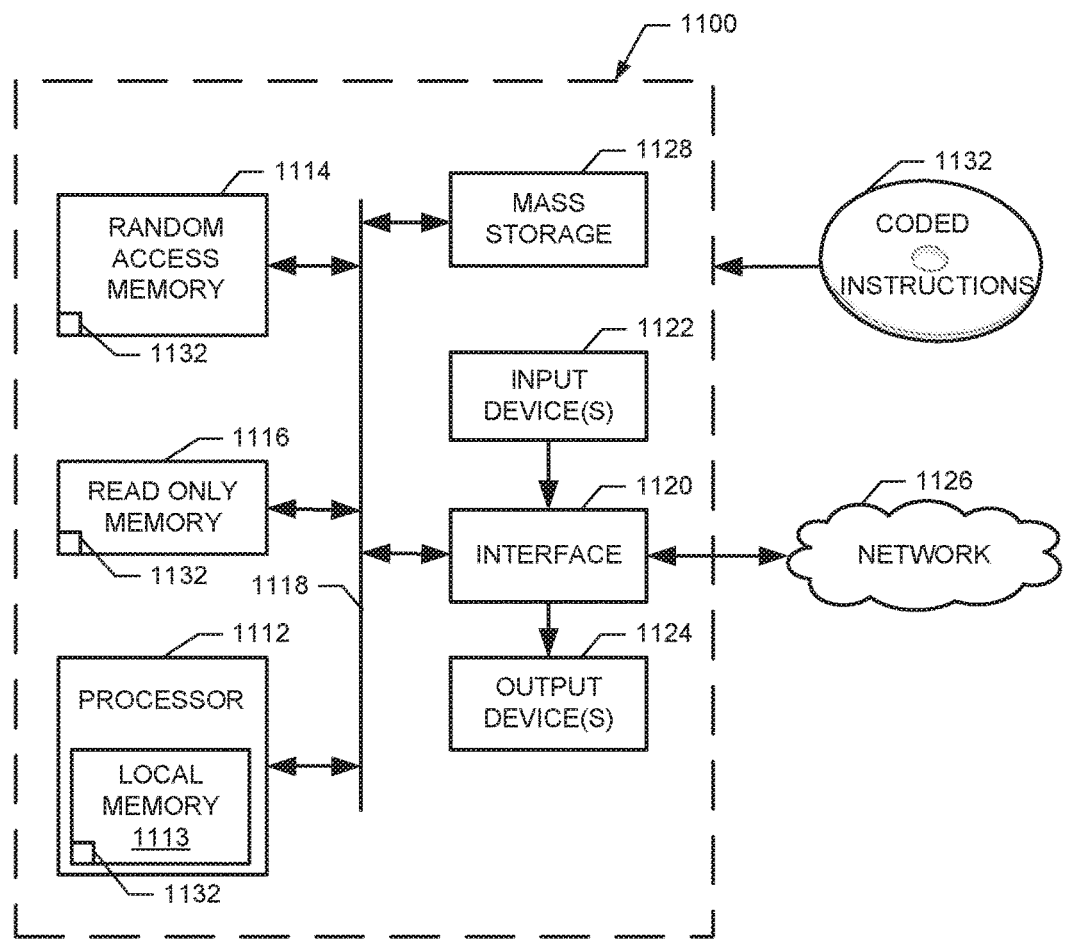
FIG. 11 is a schematic illustration of an example processor platform that may be used and/or programmed to carry out the example methods of FIGS. 6-10, and/or, more generally, to implement the example RFID devices of FIGS. 1, 2, and/or 3.

FIG. 11 is a block diagram of an example processor platform 1100 capable of executing instructions to perform the methods of FIGS. 6-10 to implement the RFID devices 124, 200, 300 of FIGS. 1, 2, and/or 3. The processor platform 1100 can be, for example, any type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

Coded instructions 1132 to implement the methods of FIGS. 6-10 may be stored in the mass storage device 1128, in the volatile memory 1114, in the non-volatile memory 1116, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a radio-frequency identification (RFID) device to be communicatively coupled to a field device of a process control system via a wired connection, the RFID device including an RFID tag to be powered via the wired connection based on power provided to the field device, the RFID device to be coupled, via the wired connection, to a signal wire transmitting the power and a control signal between a distributed control system and the field device.

2. The apparatus of claim 1, wherein the RFID device is to be coupled to the signal wire via the field device.

3. The apparatus of claim 1, wherein the RFID device is to be connected to the signal wire in parallel with the field device.

4. The apparatus of claim 1, further including a power manager to draw power from the power provided to the field device without disrupting the control signal.

5. The apparatus of claim 1, wherein a first portion of the RFID tag is powered via the power provided to the field device and a second portion of the RFID tag is powered via at least one of an RFID reader or an RFID writer.

6. The apparatus of claim 5, wherein the RFID tag includes a processor, an onboard memory, and an antenna, wherein the processor and the onboard memory are powered via the power provided to the field device and the antenna is powered via at least one of the RFID reader or the RFID writer.

7. The apparatus of claim 6, wherein the onboard memory is to store data associated with the field device, the data including at least one of maintenance information, diagnostic information, or configuration information associated with the field device.

8. The apparatus of claim 1, wherein the RFID device includes a microcontroller operatively coupled between the RFID tag and the field device, the microcontroller to store data associated with the field device in an onboard memory of the RFID tag.

9. The apparatus of claim 8, wherein the data is wirelessly transmitted between the RFID tag and at least one of an RFID reader or an RFID writer at a rate faster than a communication speed of a communication protocol associated with the distributed control system and the field device.

10. The apparatus of claim 1, wherein the RFID device is to be communicatively coupled to the distributed control system via the signal wire.

11. An apparatus comprising:
a field device of a process control system, the field device to receive power and a control signal from a distributed control system via a signal wire communicatively coupling the field device with the distributed control system; and
a radio-frequency identification (RFID) device operatively coupled to the field device via a wired connection, the RFID device having an RFID tag to receive at least a portion of the power provided to the field device via the signal wire by way of the wired connection.

12. The apparatus of claim 11, wherein the RFID device is to be connected to the signal wire in series with the field device.

13. The apparatus of claim 11, wherein the RFID device includes a power manager to draw power from the signal wire without disrupting the control signal.

14. The apparatus of claim 13, wherein the power manager is operatively coupled between the RFID tag and the field device.

15. The apparatus of claim 11, wherein the RFID device is to be connected to the signal wire in parallel with the field device.

16. A method comprising:
receiving, at a radio-frequency identification (RFID) device, power provided to a field device of a process control system from a distributed control system over a signal wire, the power received via a wired connection coupling the RFID device and the field device, wherein the power provided to the field device is associated with a control signal provided to the field device, the control signal transmitted to the field device via the signal wire from the distributed control system; and
powering an RFID tag of the RFID device with the power provided to the field device.

17. The method of claim 16, wherein powering the RFID tag includes drawing from the power provided to the field device without disrupting the control signal.

18. The method of claim 16, further including powering an antenna of the RFID tag via at least one of an RFID reader or an RFID writer when a processor and an onboard memory of the RFID tag are powered via the power provided to the field device.

19. The method of claim 16, further including storing data associated with the field device in an onboard memory of the RFID tag, the data including at least one of maintenance information, diagnostic information, or configuration information associated with the field device.

20. The method of claim 19, further including wirelessly transmitting the data between the RFID tag and at least one of an RFID reader or an RFID writer at a rate faster than a communication speed between the field device and the distributed control system.

\* \* \* \* \*